US012576405B2

(12) United States Patent
Hensley et al.

(10) Patent No.: US 12,576,405 B2
(45) Date of Patent: Mar. 17, 2026

(54) METHODS AND SYSTEMS FOR THERMAL CYCLING

(71) Applicant: Canon Virginia, Inc, Newport News, VA (US)

(72) Inventors: Maxwell Hensley, Williamsburg, VA (US); Yoichi Murakami, Tokyo (JP)

(73) Assignee: Canon Virginia, Inc., Newport News, VA (US)

( * ) Notice: Subject to any disclaimer, the term of this patent is extended or adjusted under 35 U.S.C. 154(b) by 976 days.

(21) Appl. No.: 17/511,283

(22) Filed: Oct. 26, 2021

(65) Prior Publication Data

US 2022/0184626 A1 Jun. 16, 2022

Related U.S. Application Data

(60) Provisional application No. 63/106,254, filed on Oct. 27, 2020.

(51) Int. Cl.
*B01L 7/00* (2006.01)
*B01L 3/00* (2006.01)
*C12Q 1/6844* (2018.01)

(52) U.S. Cl.
CPC ......... *B01L 7/52* (2013.01); *B01L 2300/0816* (2013.01); *B01L 2300/1827* (2013.01); *B01L 2400/0487* (2013.01)

(58) Field of Classification Search
None
See application file for complete search history.

(56) References Cited

U.S. PATENT DOCUMENTS

2007/0080362 A1* 4/2007 Scotch ............... H10H 20/8581 257/706
2009/0081771 A1 3/2009 Breidford et al.
2010/0104485 A1 4/2010 Yuan
2015/0151302 A1 6/2015 Egan et al.
2016/0051985 A1 2/2016 Knight et al.
2018/0030327 A1* 2/2018 Zhang ...................... C08K 3/22
2020/0086325 A1 3/2020 Chou et al.

FOREIGN PATENT DOCUMENTS

JP 2017-504355 A 2/2017
JP 2017-533447 A 11/2017
TW 201220445 A * 5/2012 ......... H01L 23/3733
WO 1998009728 A1 3/1998

OTHER PUBLICATIONS

TW 201220445 English Translation (Year: 2012).*

* cited by examiner

*Primary Examiner* — Elizabeth A Robinson
*Assistant Examiner* — Brittany I Fisher
(74) *Attorney, Agent, or Firm* — Canon U.S.A., Inc., IP Division

(57) ABSTRACT

The present disclosure relates to methods, devices and systems for thermal cycling of a microfluidic cartridge comprising a transparent heat sink and/or a flexible thermal spreader to seal one or more channels on the microfluidic cartridge.

18 Claims, 38 Drawing Sheets
(20 of 38 Drawing Sheet(s) Filed in Color)

PRIOR ART

| | AVG Heating Rate | AVG Cooling Rate | Uniformity (55C) | Thermal Rise of Heat Sink | Time to complete 40 Cycles |
|---|---|---|---|---|---|
| Target Values | >11°C/s | >11°C/s | <+/-1°C | <50°C | <5min |
| Simulated condition (9.375 W/cm2) *Potential best case | 104°C/s | 23.3°C/s | +/-0.76°C | 38°C | 1m 30s |
| Experimental Results 3A Condition with Aluminum Lid | 50°C/s | 35°C/s | +/-0.1 - 2.5°C | 40-45°C | 4min |

FIG. 16

| Point in Cycle | A | B | C | D | E |
|---|---|---|---|---|---|
| IR Image |  |  |  |  |  |
| Target | 95°C (start) | 95°C (holding) | 75°C (cooling) | 55°C (start) | 55°C (holding) |
| Mean Actual Temperature | 94.4°C | 95.3°C | 69.6°C | 57.2°C | 57.5°C |
| Std Dev in 25x25mm area | 1.3°C | 1.3°C | 1.4°C | 0.5°C | 0.4°C |
| Range (Max-Min) in 25x25mm area | 5.4°C | 4.8°C | 4.4°C | 2.1°C | 1.9°C |

METHODS AND SYSTEMS FOR THERMAL CYCLING

PRIORITY AND INCORPORATION BY REFERENCE

The present application claims priority to U.S. Provisional Patent Application Ser. No. 63/106,254 filed Oct. 27, 2020, the disclosure of which is incorporated herein by reference in its entirety.

FIELD OF THE DISCLOSURE

The present disclosure relates to rapid thermal cycling, as provided, for instance in applications including the amplification of genetic material. The present disclosure additionally relates to microfluidic chips for use in rapid thermal cycling systems.

BACKGROUND

In PCR and other reactions, the thermal gradient in the area of interest is a critical physical characteristic to function of the device. It is ideal to have the entire heating area gradient within a very small range so the entire solution is heated evenly and the PCR or other reaction occurs at the same time everywhere in the reaction chamber. Consistent temperatures are even more critical with digital reactions such as dPCR as uneven heating could affect the performance or restrict the PCR reactions from taking place in different areas of the cartridge, which would be less of a concern with other reactions such as qPCR. In the case of using optical methods to heat a microfluidic device, very fast heating can be achieved, but due to the need for a clear optical path from the light source to the cartridge, the applicability of traditional cooling methods such as applying an aluminum heat sink are limited.

The present application seeks to provide alternatives to allow for consistent and uniform heating and cooling.

Additionally, when PCR and other reactions requiring thermal cycling are performed in a microfluidic device, sealed or closed channels are typically a requirement, including for digital PCR. To have good thermal cycling performance, proper closing of the micro-channels is required. In order to do this, the fabrication process, especially for bonding of cartridge pieces, is key. One example of such bonding is the process to bond a channel substrate with a seal substrate, as shown in (FIG. 1). Typically, methods such as thermal bonding, solvent bonding, adhesive bonding, and laser welding are used. However, there are pros and cons for each method and the difficulty of bonding highly depends on the materials used. Some materials such as PMMA can be bonded more easily than others such as cyclic olefin polymers (COP). If the microfluidic channel is not sealed well, delamination or bubble generation can occur (FIG. 1), which can negatively impact reactions to be performed in the channel.

The present disclosure therefore also seeks to provide alternatives to allow for improved sealing of microfluidic channels.

SUMMARY OF THE DISCLOSURE

The present disclosure relates to methods and systems for thermal cycling, including for use in reactions such as PCR. To achieve rapid PCR/thermal cycling, a combination of features is provided including an optical method wherein high-power LEDs illuminate a light-absorbing material to provide rapid heating by converting light to heat. For rapid cooling, an air cooling method can be used.

These and other embodiments, objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated herein and form part of the specification, illustrate various embodiments, objects, features, and advantages of the present disclosure.

FIG. 16 is a table of results showing simulated (high flux) vs. experimental (low flux) conditions.

Figure 1:
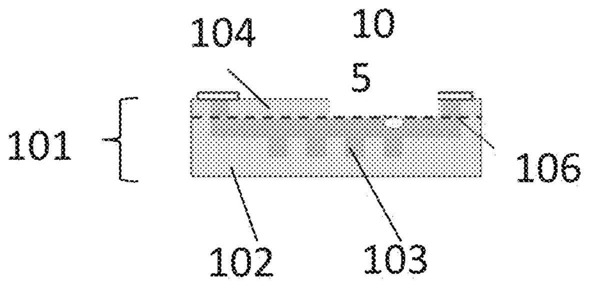
FIG. 1 is a diagram depicting an air bubble trapped in a microfluidic cartridge at the time of manufacture.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENT

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

Efficient thermal cycling of microfluidic chips requires both optimal heating and cooling, as well as a configuration that allows for sufficient viewing of the microfluidic chip. To maintain a clear optical path and provide an efficient cooling method, the present disclosure provides use of a heat sink that is transparent in the infrared (IR) through near ultraviolet (UV) wavelength range. Such a heat sink also has sufficient thermal conductivity and heat capacity to operate efficiently in heat removal from the microfluidic device. This device, in combination with a photo-thermal heating system, provides an efficient and simple method to both heat and passively cool the microfluidic device. In the device, the transparent heat sink provides a clear optical path for the light from the photo-thermal source to be directed onto the cartridge. Furthermore, the transparent heat sink has thermal diffusivities approaching that of ceramics or aluminum, allowing it to be used as an efficient heat sink.

The present disclosure therefore provides methods and systems for passively cooling an optically heated cartridge, which allows for a simpler and more compact design of such a device. Such a design also provides efficient cooling for increasing the speed of thermal cycling without affecting the heating rate significantly. This disclosure also allows for combinations of multiple light sources, for instance, LEDs (including in arrays of LEDs), lasers, lamps, and similar, to increase the available heated area or increase the light intensity. Additionally provided is an efficient means to measure temperature of the heated area via an infrared thermometer. Further, devices and systems according to the present disclosure result in minimal cooling gradient across the microfluidic chip.

In one embodiment, there is provided a device for thermal cycling a microfluidic cartridge comprising a microfluidic cartridge, wherein a light-absorbing material is in contact with the microfluidic cartridge; a first heat sink in contact with the microfluidic cartridge; a second heat sink that is in proximity to the first heat sink; one or more light sources that are in proximity to the first heat sink; and a temperature sensor to detect a change in temperature of the microfluidic cartridge; wherein the device alternately heats and cools the microfluidic cartridge. In one embodiment, the one or more light sources provide light within the infrared to UV wavelength range. In certain embodiments, the first heat sink is transparent. In a further embodiment, the first heat sink is transparent to light within the infrared to UV wavelength range. In other embodiments, the first heat sink comprises a thermally conductive material. The first heat sink, can optionally comprise sapphire.

In a further embodiment, the light-absorbing material converts light to heat. The light-absorbing material can be on or within the microfluidic cartridge, or can be in thermal communication with the microfluidic cartridge. The light-absorbing material can be contained on or within a part of the device other than the microfluidic cartridge, and the material is in thermal communication with the microfluidic cartridge when the cartridge is placed within the device. The light-absorbing material can be attached to the microfluidic cartridge or other structure within the device by means of an adhesive. In certain embodiment, the light-absorbing material can be attached to the transparent heat sink.

In yet another embodiment, the transparent first heat sink allows for the transport of light through the heat sink to the microfluidic cartridge during heating. The transparent first heat sink can act as a passive heat sink to cool the microfluidic cartridge during cooling. In another embodiment, the second heat sink comprises a thermally conductive material, and can optionally be aluminum.

The one or more light sources can be one or more LEDs. In certain embodiments, the light from the one or more light sources is captured and transported to the microfluidic cartridge by the first transparent heat sink.

In a further embodiment, the device additionally comprises a feedback and control unit in communication with the temperature sensor to start, stop, and provide temperature control of the heating and cooling. Yet further still, the device can additionally comprise one or more infrared sensors in proximity to the device such that the one or more sensors can view the microfluidic cartridge. In addition or alternatively, at least one resistive temperature detector element can be provided in contact with a surface of the first heat sink that is in contact with the microfluidic cartridge. Resistive temperature detectors can be of the form and can be used in the manner as described in U.S. Published Patent Application No. 20120052560, the disclosure of which is incorporated herein by reference in its entirety.

In a further embodiment, the microfluidic cartridge can comprise open microfluidic channels, and a flexible heat spreader is provided between the open microfluidic channels and the first heat sink. In another embodiment, pressure can be applied such that the first heat sink contacts and deforms the flexible heat spreader, such that the flexible heat spreader contacts microfluidic cartridge and fluidically seals the microfluidic channels.

In a further embodiment, there is provided a method for thermal cycling a microfluidic cartridge comprising: (i) providing a device for comprising a microfluidic cartridge, wherein a light-absorbing material is in contact with the microfluidic cartridge; a first heat sink in contact with the microfluidic cartridge; a second heat sink that is in proximity to the first heat sink; one or more light sources that are in proximity to the first heat sink; and a temperature sensor to detect a change in temperature of the microfluidic cartridge; (ii) turning on the one or more light sources to heat the microfluidic cartridge; (iii) turning off the one or more light sources to cool the microfluidic cartridge; and (iv) performing steps (ii) and (iii) repeatedly in succession for the duration of the thermal cycle.

Figure 2:
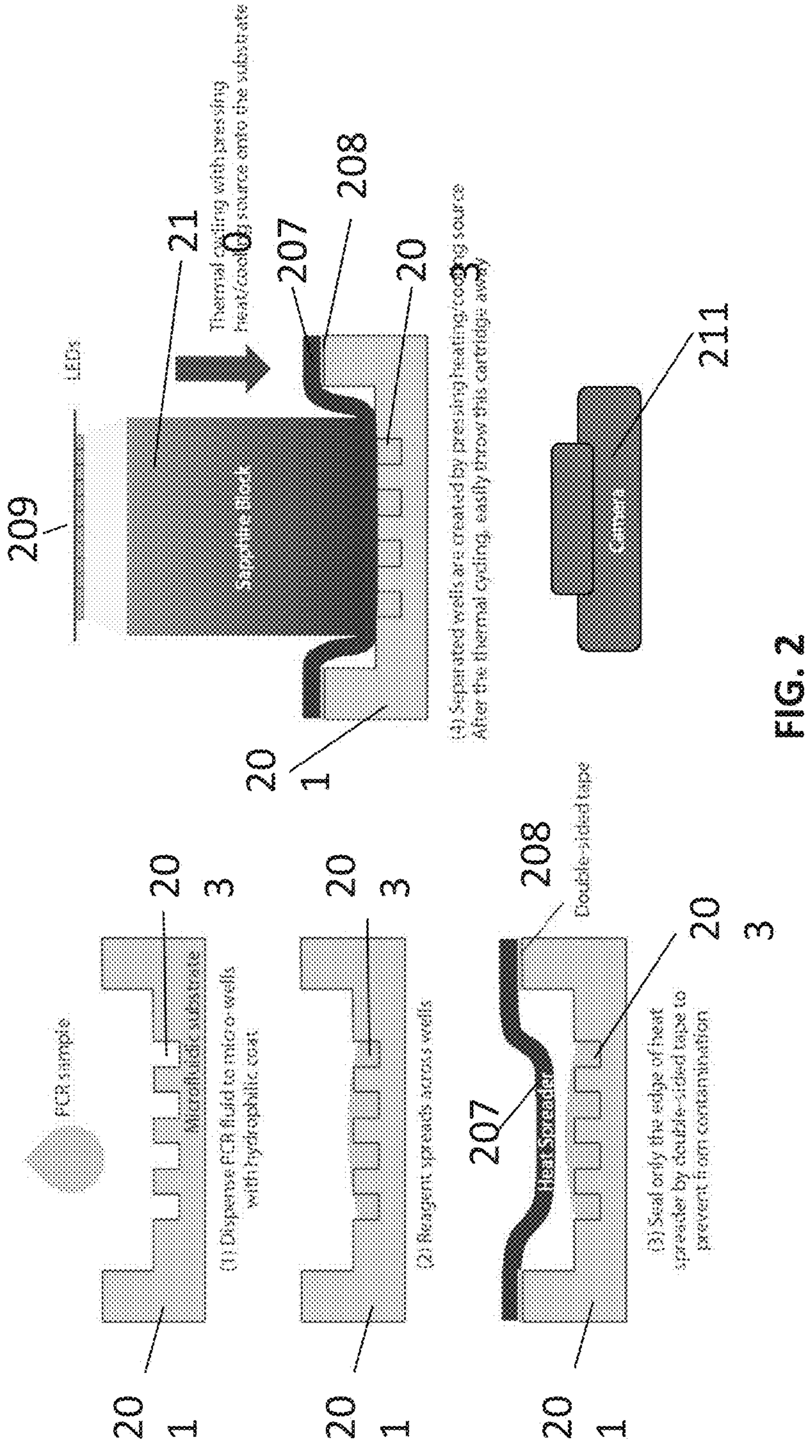
FIG. 2 is a diagram depicting an embodiment using a heat spreader to seal the microfluidic channels.
Figure 3:
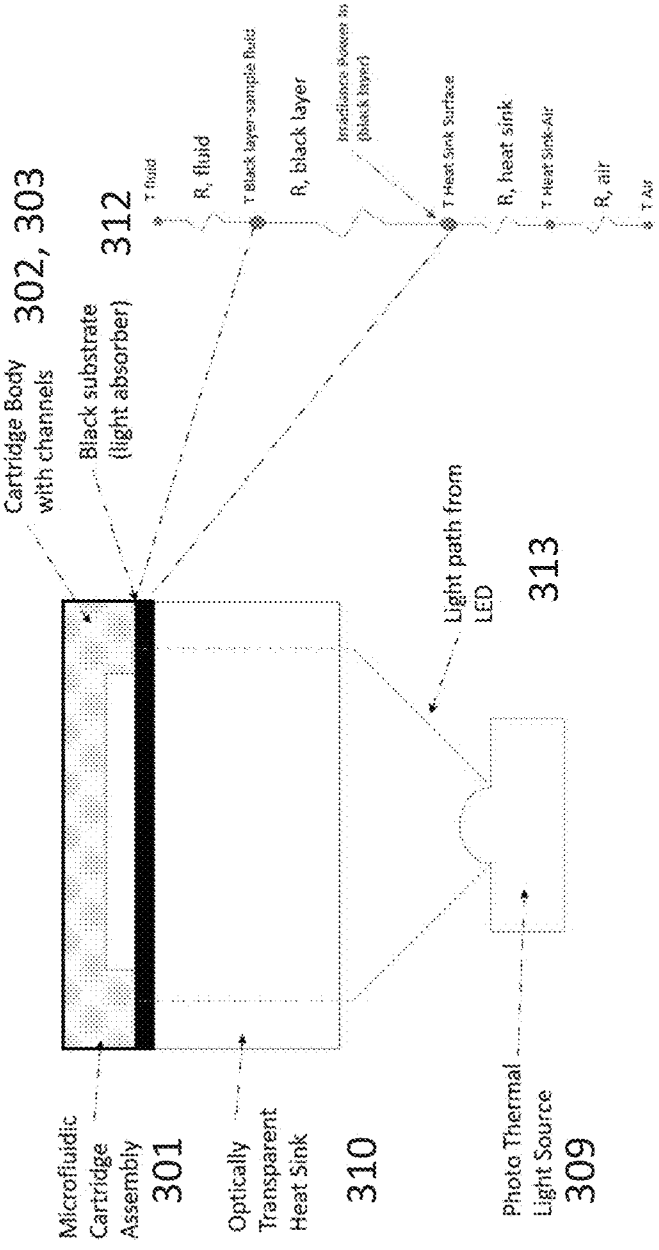
FIG. 3 is a conceptual diagram of a component layout according to one embodiment.

FIG. 3 shows a model of such a system or device according to one embodiment. A light absorption layer 312 with high light absorptivity in the wavelength range of the photo-thermal light is placed in direct contact with the fluidic chamber 301, which can be a microfluidic cartridge or microfluidic cartridge assembly where multiple components are combined to form and/or hold the microfluidic cartridge in place. For instance, the microfluidic cartridge can be made of a single layer body 302 having open wells or channels 303 which are closed by the pressure applied to an absorption layer 312, a gasket or similar. For example, FIG. 2, provides a microfluidic cartridge 201 which has wells or channels 203 which are initially open to the environment. Following application of a fluidic sample to the wells or channels 203, a heat spreader 207 can be adhered to the cartridge 201 using an appropriate adhesive means 208 (for instance, liquid adhesive, epoxy, double sided tape or the like). Application of a transparent heat sink 210 such as a sapphire block to the gasket 207 deforms the gasket such that it comes into contact with the upper surface of the cartridge 201 and effectively seals off the wells or channels 203. This results in the transparent heat sink 210 being in thermal communication with the heat spreader 207 and the cartridge 201, such that when photo-thermal light source 209 is turned on, the light passes through the transparent heat sink 210 and is able to efficiently and uniformly heat the cartridge 201. Such an embodiment directly combats the problem found in the art and described herein (FIG. 1) of cartridges 101 comprising a lower lid 102 and an upper lid 104 which are joined at a bonding surface 106, with wells or channels 103 between. Improper sealing of the wells or channels 103 can cause delamination or air bubble 105 formation, thereby negatively impacting reactions in the channel.

With reference again to FIG. 3, in another embodiment, the cartridge body can be formed of a top and bottom layer, wherein the layers, when attached to each other, enclose the wells or channels 303. The absorption layer 312 can be a part of the cartridge 301, resulting in typical concerns over thermal contact resistance becoming negligible and efficient heating can be achieved with lower power requirements. Alternatively, the absorption layer 312 can be placed on, or in thermal communication with, the transparent heat sink 310 described herein. The absorption layer 312 can be a black or dark substrate or a heat spreader. In certain embodiments, absorption layer 312 can also function as a gasket. A photo-thermal light source 309 is positioned distally from the cartridge 301, such that the transparent heat sink 310 is between the photo-thermal light source 309 and the cartridge 301. The photo-thermal light source 309 is turned on for heating. For cooling, the photo-thermal light source 309 is turned off, and the effectively isothermal state of the transparent (first) heat sink 310 can passively cool the system (including microfluidic cartridge assembly 301). FIG. 3 additionally provides a summary of the various temperature points and thermal contact resistances of the materials between the transparent heat sink 310 and the fluid sample within the cartridge 301.

Figure 4:
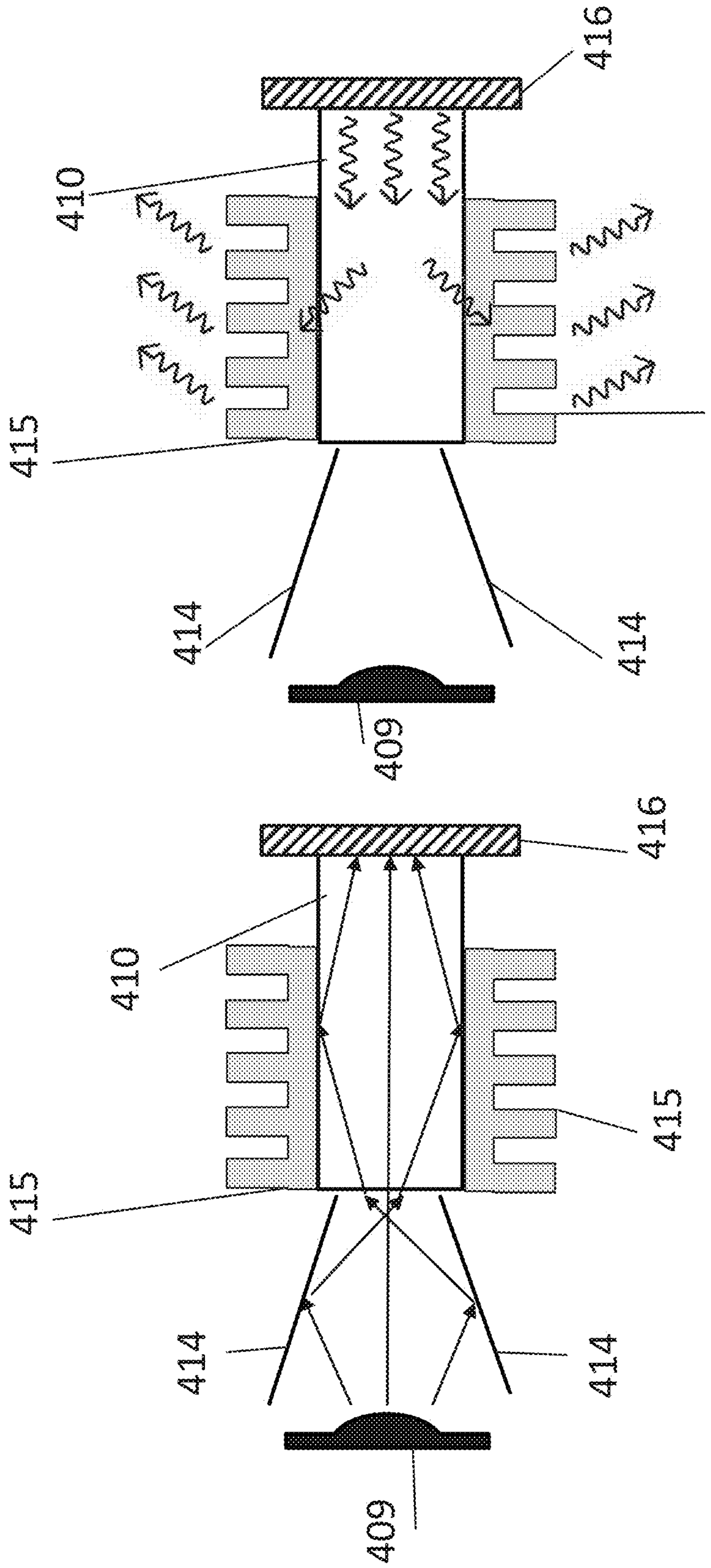
FIG. 4 is a conceptual diagram of a component layout according to one embodiment depicting functionality during heating and cooling.

A depiction of the functionality of the transparent heat sink 410 during the heating (left) and cooling (right) phases of a thermal cycle in a further embodiment is provided in FIG. 4. A photo-thermal light source 409 is arranged such that light from the light source 409 can travel through a light guide having a reflective film or polished surface 414 before entering an optically transparent heat sink 410. The transparent heat sink 410 is placed within a secondary heat sink 415. The opposing end of the heat sink 410 is in thermal communication with a sample 416, which may be contained with a microfluidic cartridge or similar. During heating, the photo-thermal light source 409 is turned on, causing light (straight arrows) to travel through the light guide and the transparent heat sink 410 before reaching and heating the sample 416. During cooling, the thermal light source 409 is turned off, and heat (wavy arrows) dissipates from the sample 416 through the transparent heat sink 410 and the secondary heat sink 415, resulting in a decreased temperature of the sample 416.

Figure 12:
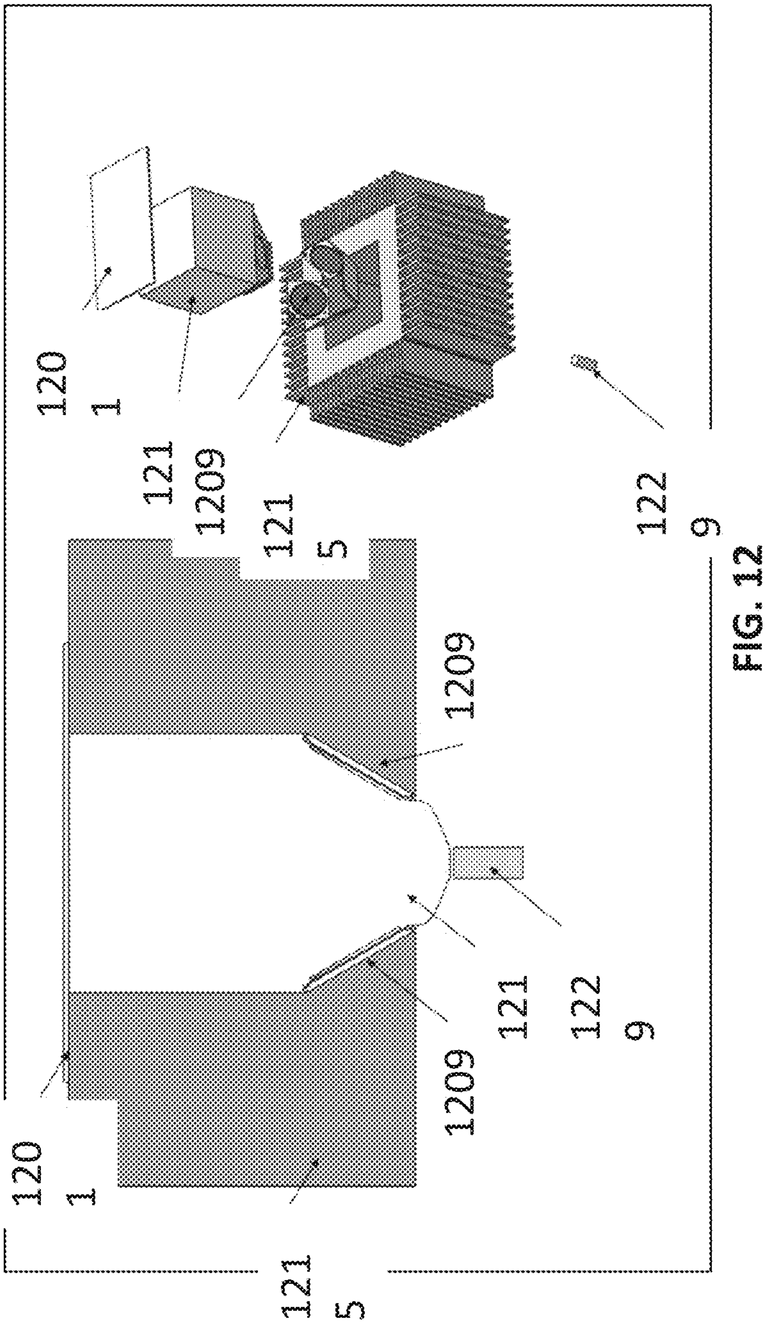
FIG. 12 is a diagram depicting a multi-LED configuration with infrared temperature sensing according to one embodiment.
Figure 13:
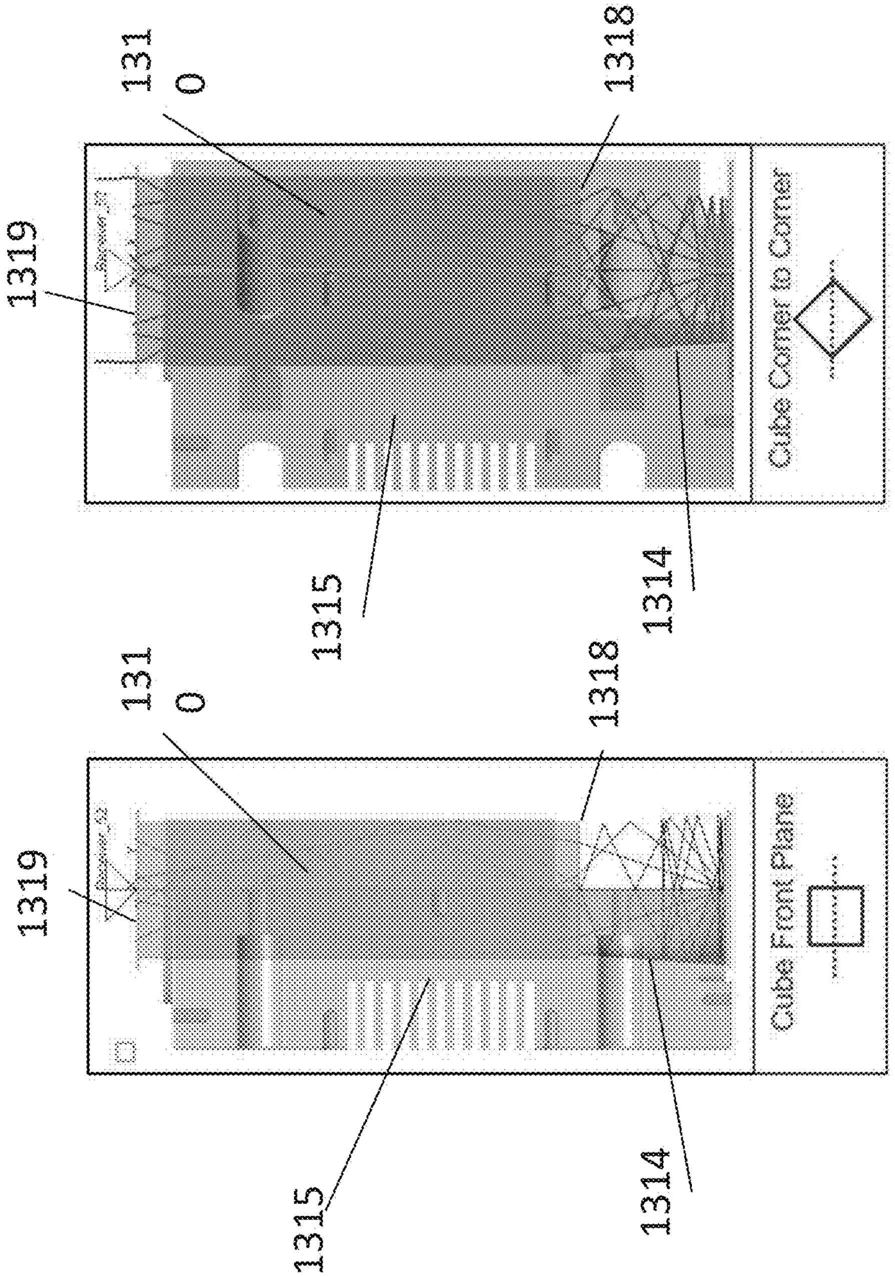
FIG. 13 is a diagram depicting ray traces within the sapphire cube and light guide for two exemplary configurations.

In some embodiments, the transparent heat sink can be made of sapphire ($Al_2O_3$) or other transparent materials. Advantageously, by using transparent material as a heat sink which has a refractive index near or higher than that of glass (sapphire has a high index of refraction of 1.73), it can be used as a light pipe or light guide for the incoming photo-thermal light source. This allows the light profile to be evenly distributed via internal refraction, in some embodiments including via total internal refraction, improving the heating uniformity in the area of interest. FIG. 13 provides simulated ray traces starting within the secondary heat sink 1315 having an interior surface having a reflective film or polished surface 1314 that acts as a light guide, with the rays then passing into the entry surface 1318 of the transparent heat sink 1310 and continuing through the transparent heat sink and out the exit surface 1319. The left and right simulations differ only in the plane of the transparent heat sink 1310 through which they are viewed—a front plane view on the left, and a corner to corner plane view on the right, both of which depict the even distribution of the light profile via internal refraction. This also allows for several LEDs to be used together, combining the total irradiant flux into a single plane. This also permits larger cartridge areas to be heated while maintaining similar heat flux ranges and allowing increased flux power densities. FIG. 12 shows configurations employing multiple LEDs with the transparent heat sink. In certain embodiments, the transparent material (such as sapphire) has a high thermal diffusivity when compared to other optical materials, allowing for efficient cooling of the system. Other relevant properties of the transparent material of the primary heat sink include having good strength, high surface hardness and thermal stability, as well as having good optical transmission in the visible to near-infrared light spectrum.

Figure 5A:
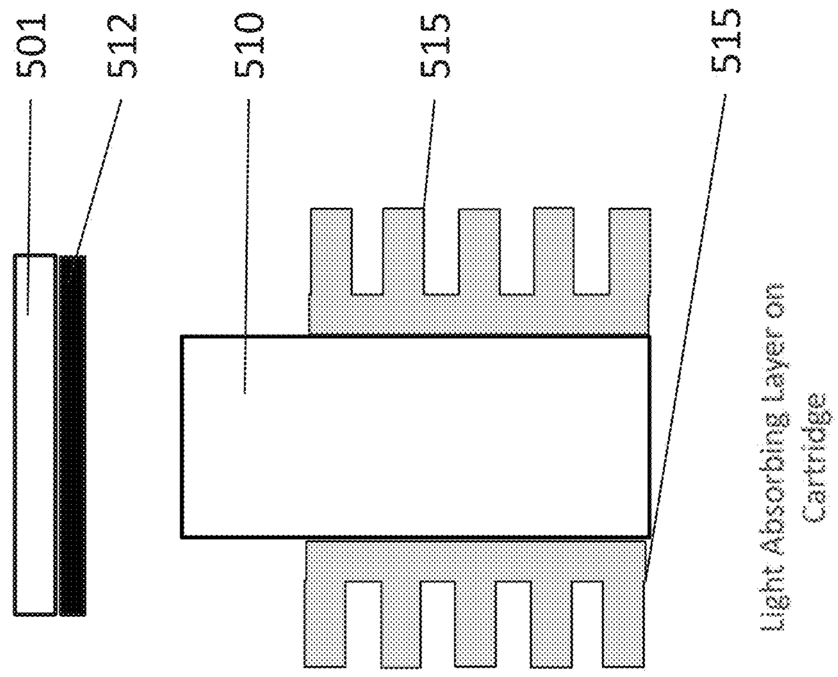
FIG. 5A-B are diagrams depicting alternative component layouts.
Figure 5B:
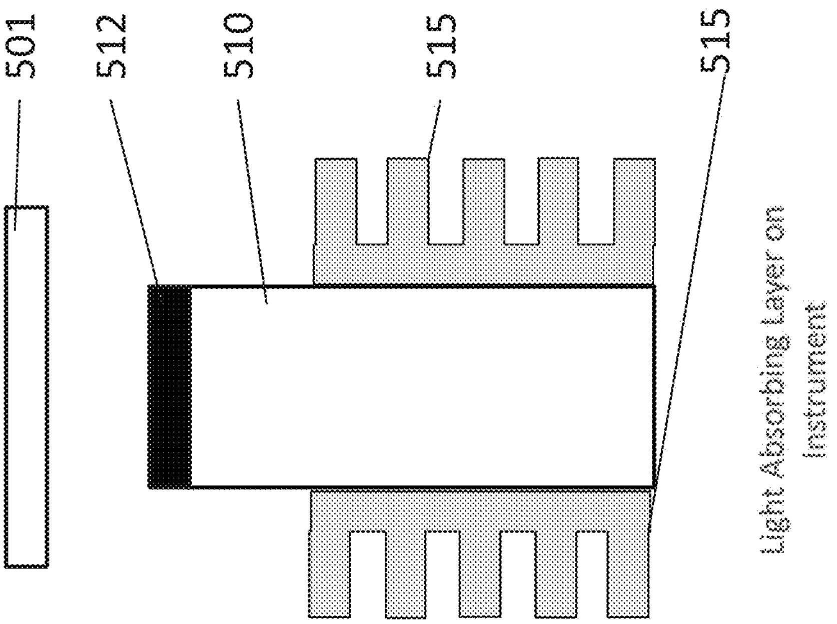

Further embodiments are provided in FIGS. 5A-B, which provide alternate configurations of the light absorbing layer 512. In FIG. 5A, the transparent heat sink 510 is placed within secondary heat sink 515. A cartridge 501 has attached thereto a light absorbing layer 512, such that the light absorbing layer 512 is disposed between the cartridge 501 and the transparent heat sink 510. In certain embodiments, physical contact can be made between light absorbing layer 512 and transparent heat sink 510. In other embodiments, no physical contact is made between light absorbing layer 512 and transparent heat sink 510, however, in either configuration, the transparent heat sink 510 is in thermal communication with the light absorbing layer 512, which in turn is in thermal communication with cartridge 501. In FIG. 5B, the light absorbing layer 512 is instead attached to the transparent heat sink 510. Light absorbing layer 512 can make physical contact with cartridge 501, or in other embodiments, no physical contact is made between light absorbing layer 512 and cartridge 501. In either configuration, the transparent heat sink 510 is in thermal communication with the light absorbing layer 512, which in turn is in thermal communication with cartridge 501.

Figure 6A:
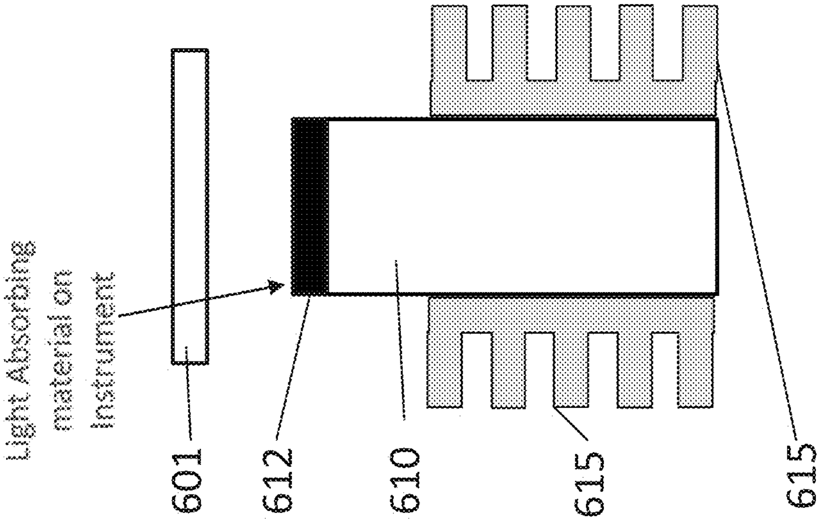
FIG. 6A-D are diagrams depicting alternative component layouts.
Figure 6B:
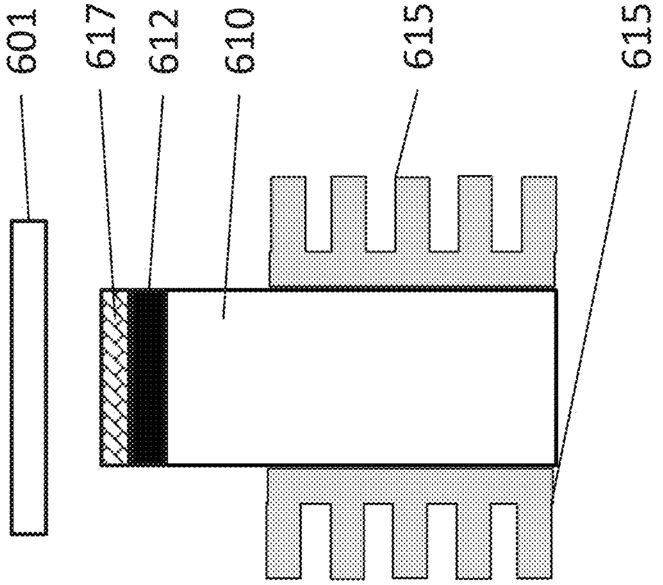

FIG. 6A-D provide additional embodiments having alternative configurations. In FIG. 6A, transparent heat sink 610 is located within or between secondary heat sink 615. A single light absorbing layer 612 can be directly attached or bonded to transparent heat sink 610 as depicted in FIG. 6A, such that the single light absorbing layer 612 is disposed between transparent heat sink 610 and cartridge 601. Alternatively, as shown in FIG. 6B, a multi-layer light absorbing layers 612, 617 can be directly attached or bonded to transparent heat sink 610, such that the multi-layer light absorbing layers 612, 617 are disposed between transparent heat sink 610 and cartridge 601. For both of the configurations shown in FIG. 6A-6B, upon insertion of the cartridge 601 into the instrument or device comprising the transparent heat sink 610, secondary heat sink 615, and the one or multi-layer light absorbing layers 612, 617, the cartridge 601 can be positioned such that it is in direct contact with the one or multi-layer light absorbing layers 612, 617 or such that it is in thermal communication with the one or multi-layer light absorbing layers 612, 617, such that heating and cooling can be effected upon the cartridge 601 using the process described herein.

Figure 6D:
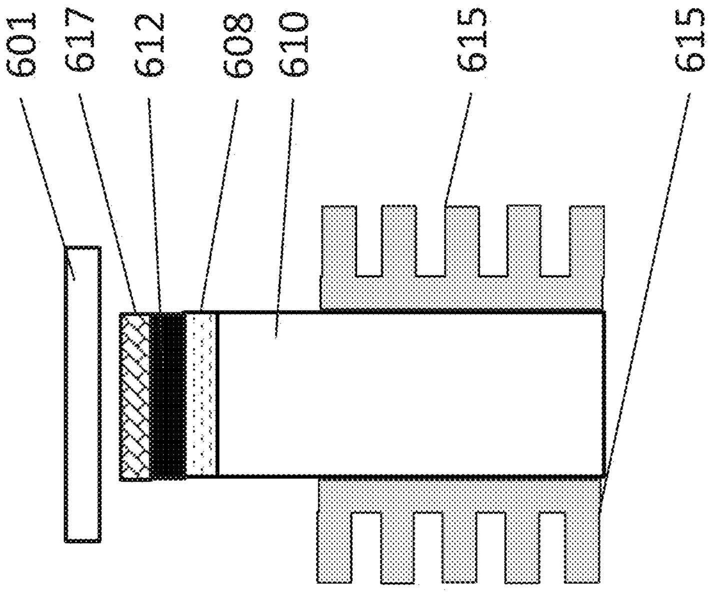
Figure 6C:
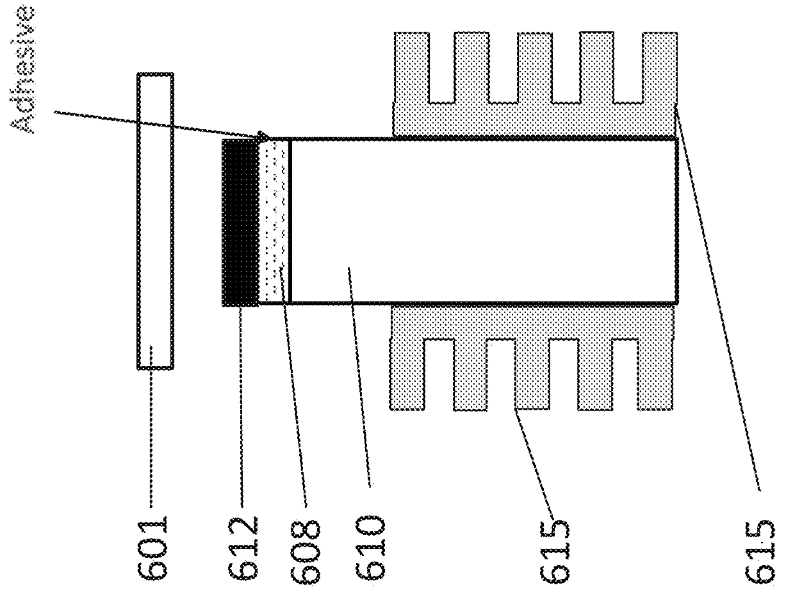

In FIG. 6C transparent heat sink 610 is located within or between secondary heat sink 615. A single light absorbing layer 612 can be attached or bonded to transparent heat sink 610 via an adhesive 608, such that the single light absorbing layer 612 is disposed between transparent heat sink 610 and cartridge 601, and an adhesive is disposed between transparent heat sink 610 and the single light absorbing layer 612. Alternatively, as shown in FIG. 6D, a multi-layer light absorbing layers 612, 617 can be attached or bonded to transparent heat sink 610 via an adhesive 608, such that the multi-layer light absorbing layers 612, 617 are disposed between transparent heat sink 610 and cartridge 601, and an adhesive is disposed between transparent heat sink 610 and at least one of multi-layer light absorbing layers 612, 617. Adhesives that can be employed in the practice of the present disclosure include liquid adhesives, epoxy, double-side adhesive tape, or the like.

For each of the configurations shown in FIG. 6A-6D, upon insertion of the cartridge 601 into the instrument or device comprising the transparent heat sink 610, secondary heat sink 615, and the one or multi-layer light absorbing layers 612, 617 (with or without adhesive 608), the cartridge 601 can be positioned such that it is in direct contact with the one or multi-layer light absorbing layers 612, 617 and/or such that it is in thermal communication with the one or multi-layer light absorbing layers 612, 617, such that heating and cooling can be effected upon the cartridge 601 using the process described herein. Similarly, in those instances where an adhesive 608 is used between transparent heat sink 610 and the single light absorbing layer 612 or one or more of the multi-layer light absorbing layers 612, 617, the transparent heat sink 610 is in thermal communication with the single light absorbing layer 612 and/or multi-layer light absorbing layers 612, 617, which in turn are in direct contact and/or thermal communication with cartridge 601, such that heating and cooling can be effected upon the cartridge 601 using the process described herein FIG. 7A-D provide different configurations of the one or more photo-thermal light source(s) 709. In each of FIG. 7A-7D, a transparent heat sink 710 is provided having at least one first surface disposed at one end, and a second surface at a distal end, wherein the at least one first surface is one or more entry surface(s) 718, and the second surface is an exit surface 719. At least one, or alternatively, each of the at least one entry surface(s) 718 has at least one photo-thermal light source(s) 709 directed at the entry surface(s) 718, such that light can enter the transparent heat sink 710 at the entry surface(s) 718 and travel through the transparent heat sink 710 to the exit surface 719. Light leaving the exit surface 719 will then heat the at least one light absorbing layer and the cartridge which are in thermal communication with the transparent heat sink 710.

In one embodiment, the entry surface(s) 718 and exit 719 surface of the transparent heat sink 710 (which transparent heat sink 710 functions as a light guide), can be, respectively, round to round, round to square, square to round or any 2D shape amalgamated into to another 2D shape. Entry surface(s) 718 and exit 719 surface can be the same or different cross sectional area. Photo-thermal light source 709 can comprise a single light source or a set of more than one light sources, and such a single light source or a set of more than one light sources can be used at one or more entry surfaces 718. In another embodiment, entry surface(s) 718 and exit surface 719 can optionally be polished smooth or have a textured diffuse surface. Entry surface(s) 718 and exit surface 719 can optionally have an anti-reflective coating applied.

Figure 7A:
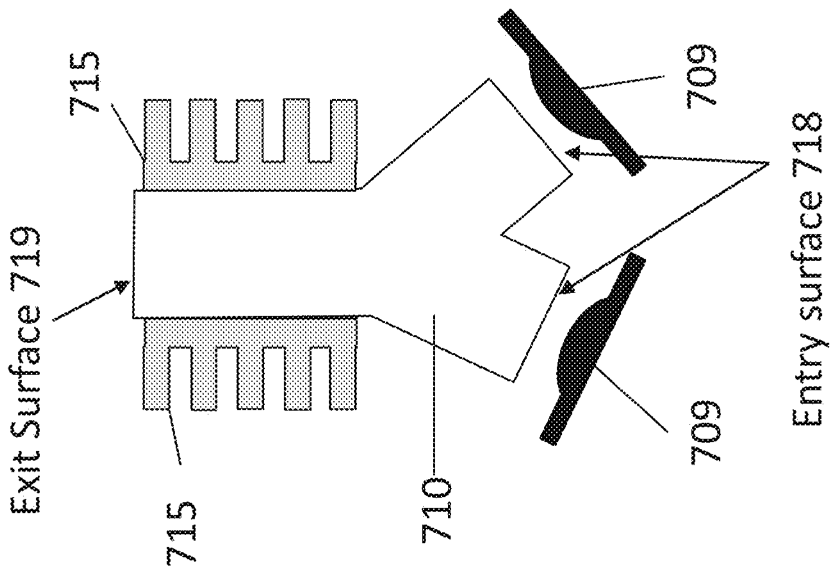
FIG. 7A-D are diagrams depicting alternative light source configurations.
Figure 7B:
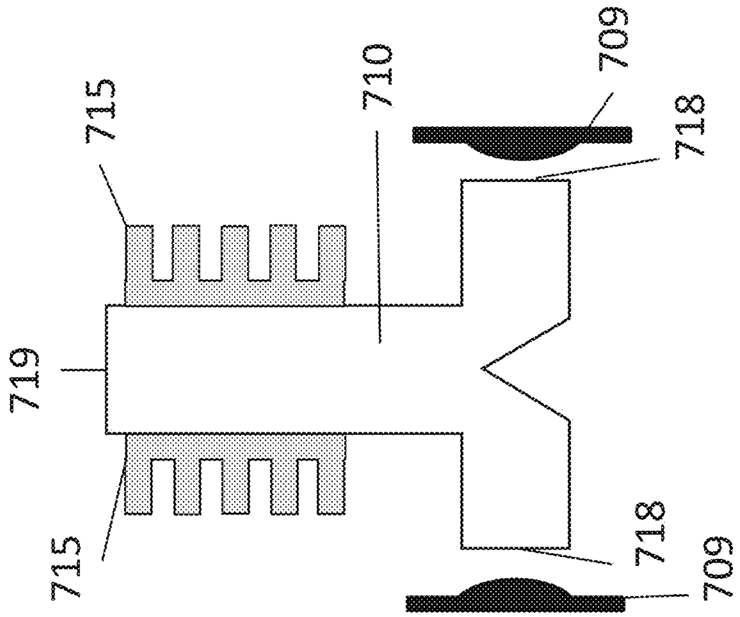
Figure 7D:
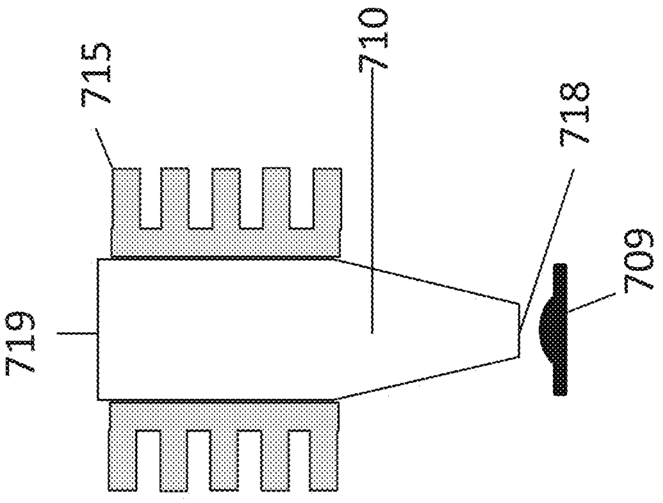
Figure 7C:
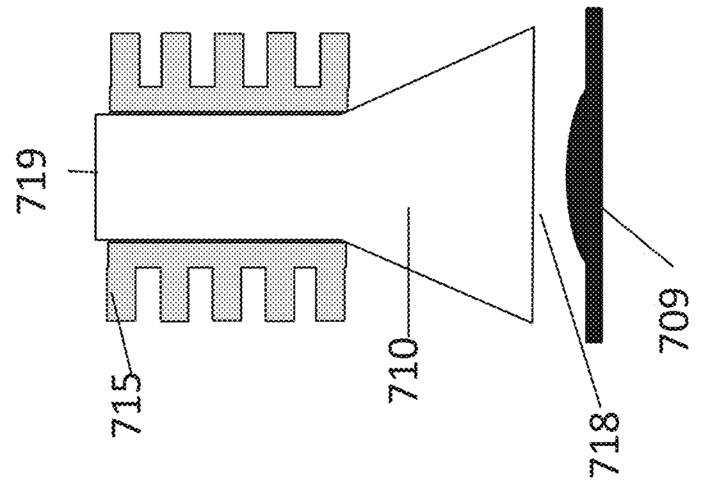

FIG. 7A provides a transparent heat sink 710 having two distinct entry surfaces 718, and a single exit surface 719. The entry surfaces 718 and exit surface 719 are positioned in an inverted "Y" shape, with an angle of less than 180° between the two entry surfaces 718. Each of the two entry surfaces 718 has a photo-thermal light source 709 directed at the entry surface 718, which photo-thermal light source 709 can be a single light source or a set of more than one light sources. In FIG. 7B, transparent heat sink 710 has two distinct entry surfaces 718, and a single exit surface 719. The entry surfaces 718 and exit surface 719 are positioned in an inverted "T" shape, with an angle of approximately 180° between the two entry surfaces 718. In such a configuration, transparent heat sink 710 can have a structure configured to allow the entering light to be reflected towards the exit surface 719, for example, a cut out that provides an angled surface opposite each of the entry surfaces 718. Each of the two entry surfaces 718 has a photo-thermal light source 709 directed at the entry surface 718, which photo-thermal light source 709 can be a single light source or a set of more than one light sources. FIGS. 7C and 7D both depict configurations where the at least one entry surface(s) 718 have a different size and/or shape from exit surface 719. In FIG. 7C, entry surface 718 is depicted as having a wider shape or larger cross-sectional opening than that of exit surface 719. In FIG. 7D, the opposite configuration is depicted, wherein entry surface 718 is depicted as having a smaller shape or larger cross-sectional opening than that of exit surface 719.

Figure 8:
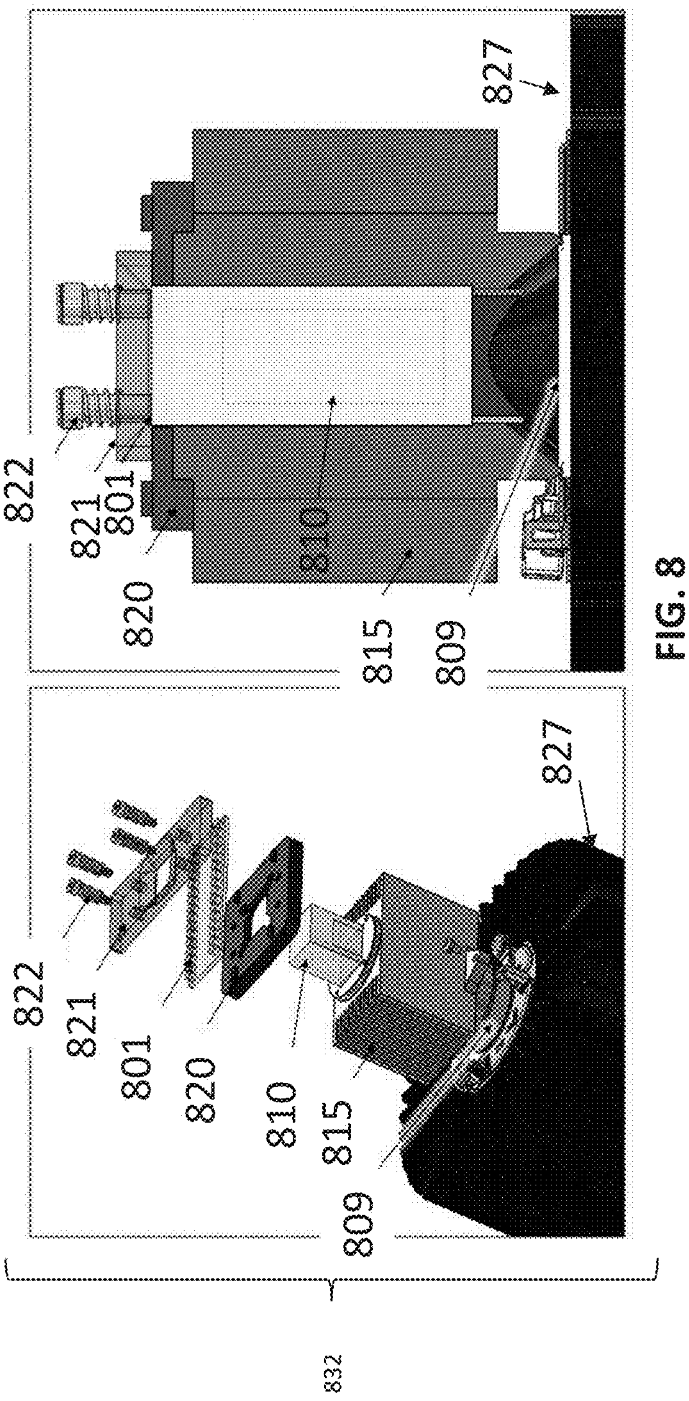
FIG. 8 is a diagram showing an exemplary thermal cycler according to one embodiment.

In one embodiment, a device 832 according to the present disclosure is provided in FIG. 8. A photo-thermal light source 809 is positioned on a light source heat sink 827. A secondary heat sink 815 having an interior (i.e., center) opening is provided above the photo-thermal light source 809, which opening has placed therein a transparent heat sink 810. The transparent heat sink 810 can be equal in length to the secondary heat sink 815, or can be longer or shorter than the secondary heat sink 815, and can be positioned such that the transparent heat sink 810 is flush or extends beyond the end of the secondary heat sink 815 that is distal to the photo-thermal light source 809. A polymer mounting plate 820 is attached to and/or disposed on the top of the device over the transparent heat sink 810, and a microfluidic cartridge 801 is positioned on the polymer mounting page 820 and secured using clamp plate 821 and shoulder screws and spring 822 to compress the claim plate 821 to hold microfluidic cartridge 801 in thermal communication and/or direct contact with transparent heat sink 810.

Figure 9:
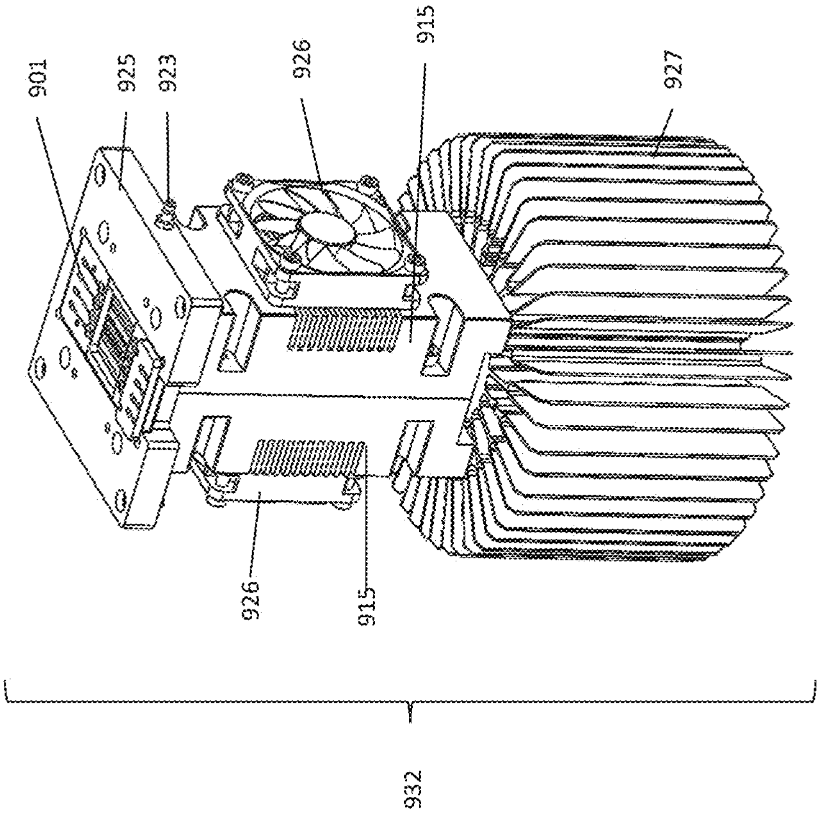
FIG. 9 is a diagram of a thermal cycler according to one embodiment.
Figure 10:
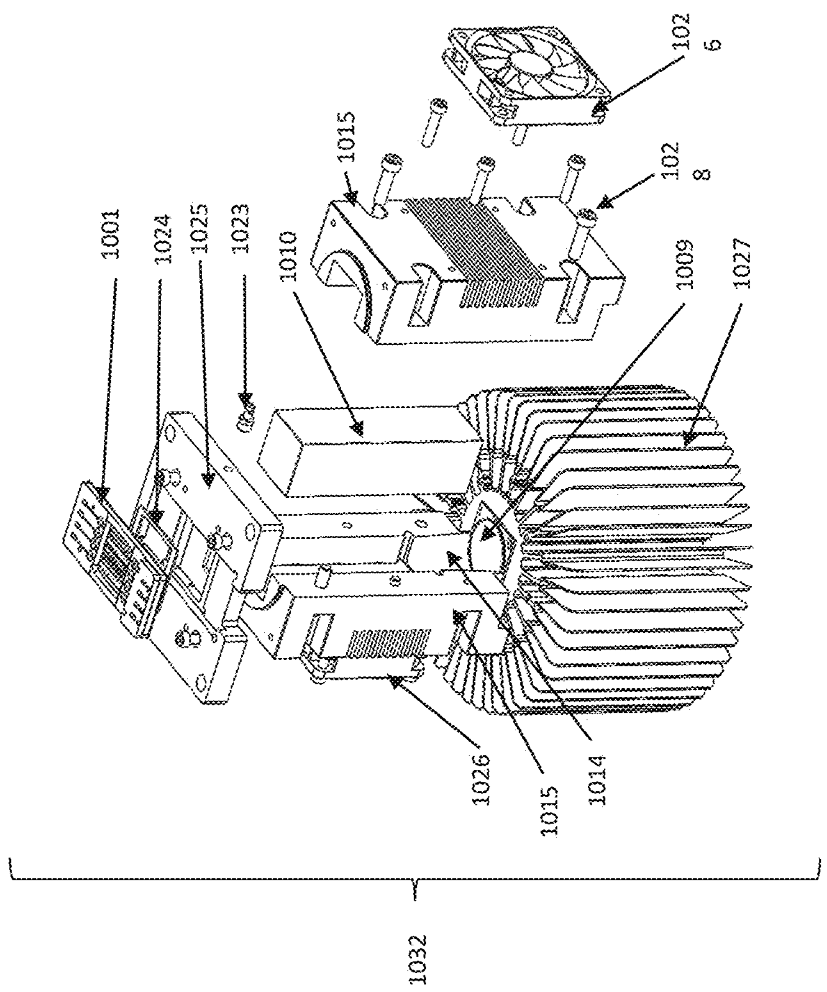
FIG. 10 is an exploded view of a diagram of a thermal cycler according to one embodiment.

A further embodiment is provided in FIG. 9 which depicts a device 932 according to the present disclosure having two secondary heat sinks 915 which can be positioned opposite each other to enclose a transparent heat sink (shown in FIG. 10). A photo-thermal light source 909 is positioned on a light source heat sink 927. The two secondary heat sinks 915 are provided above the photo-thermal light source 909, and positioned such that they can be attached together, providing in internal opening or space for placement of a transparent heat sink. Fans 926 can be disposed on either or both secondary heat sinks 915 to assist in the rapid cooling of the device. Cartridge 910 is positioned above the transparent heat sink and secondary heat sinks 915 by cartridge interface plate 925, which can optionally comprise a polymer mounting plate and clamp plate, or which can be otherwise configured to securely hold the cartridge 910 in direct contact or in thermal communication with the transparent heat sink. A vacuum connection port 923 allows for application of a vacuum to the cartridge interface plate 925, assisting in providing uniform contact between the cartridge 910 and other components necessary for thermal communication, which can include a transparent heat sink, adhesives, one or more light absorbing layers, gasket, etc.

FIG. 10 provides an exploded view of FIG. 9, in which one of the two secondary heat sinks 1015 has been removed from the device 1032, such that the transparent heat sink 1010 is visible. Transparent heat sink 1010 will fit in the internal opening or space provided when secondary heat sinks 1015 are attached to each other by means of fasteners 1028.

A photo-thermal light source 1009 is positioned on a light source heat sink 1027, which are positioned below the two secondary heat sinks 1015. Fans 1026 can be disposed on either or both secondary heat sinks 1015 to assist in the rapid cooling of the device. The internal surface of the secondary heat sinks 1015 located between the photo-thermal light source 1009 and the transparent heat sink 1010 are provided with a reflective film or polished surface 1014, such that when secondary heat sinks 1015 are attached together, the internal surface having a reflective film or polished surface 1014 acts as a light guide directing light from the photo-thermal light source 1009 into the entry surface of the transparent heat sink 1010. Cartridge 1001 is positioned above the transparent heat sink 1010 and secondary heat sinks 1015 by cartridge interface plate 1025. A gasket 1024 is disposed under the cartridge 1001, to which a vacuum can be applied via vacuum connection port 1023, which vacuum assists in providing uniform contact between the gasket 1024, the cartridge 1001 and any other components necessary for thermal communication with the transparent heat sink 1010, which can include adhesives, one or more light absorbing layers, etc. In some embodiments, the gasket 1024 can function as a light absorbing layer and/or heat spreader.

Figure 14:
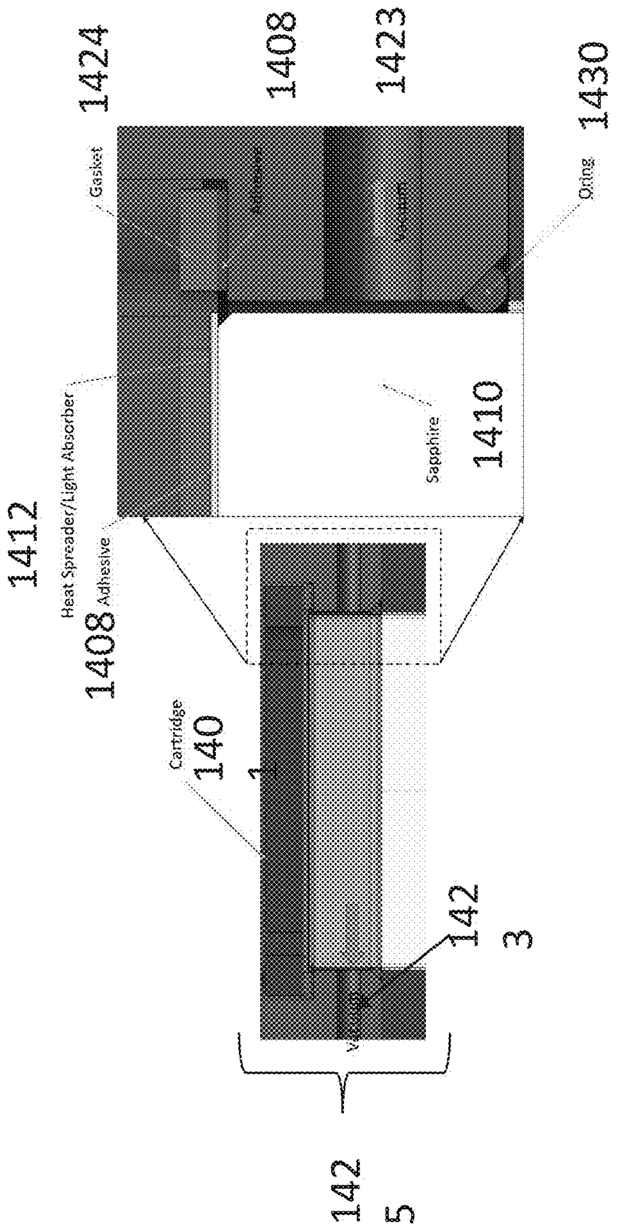
FIG. 14 is a diagram depicting a configuration of a gasket and vacuum sealing system for a cartridge according to one embodiment.

FIG. 14 provides an exemplary configuration of a gasket and vacuum sealing system for the cartridge 1401. Cartridge interface plate 1425 accepts cartridge 1401, with a gasket 1424 disposed under the cartridge 1401 within the cartridge interface plate 1425. Gasket 1424 can be attached to the cartridge interface plate 1425 by means of an adhesive 1408. A light absorbing layer and/or heat spreader 1412 can be attached to either the lower surface of the gasket opposite the microfluidic cartridge, or to the transparent heat sink 1410. A vacuum can be applied to vacuum port 1423, such that the transparent heat sink 1410, light absorbing layer and/or heat spreader 1412, gasket 1424 and cartridge 1401 are placed and held in direct contact and/or such that increased thermal communication is provided. In alternate embodiments, the light absorbing layer and/or heat spreader 1412 can be optional, for instance in circumstances where the gasket 1024 can act as a light absorbing layer or heat spreader, or may be placed in a different position such that the light absorbing layer and/or heat spreader 1412 is in direct contact with the cartridge 1401. Sustained, direct contact between the components in FIG. 14 can be desirable to increase the thermal communication from the transparent heat sink 1410 to the cartridge 1401, however such direct contact is not required provided thermal communication is obtained.

Figure 11:
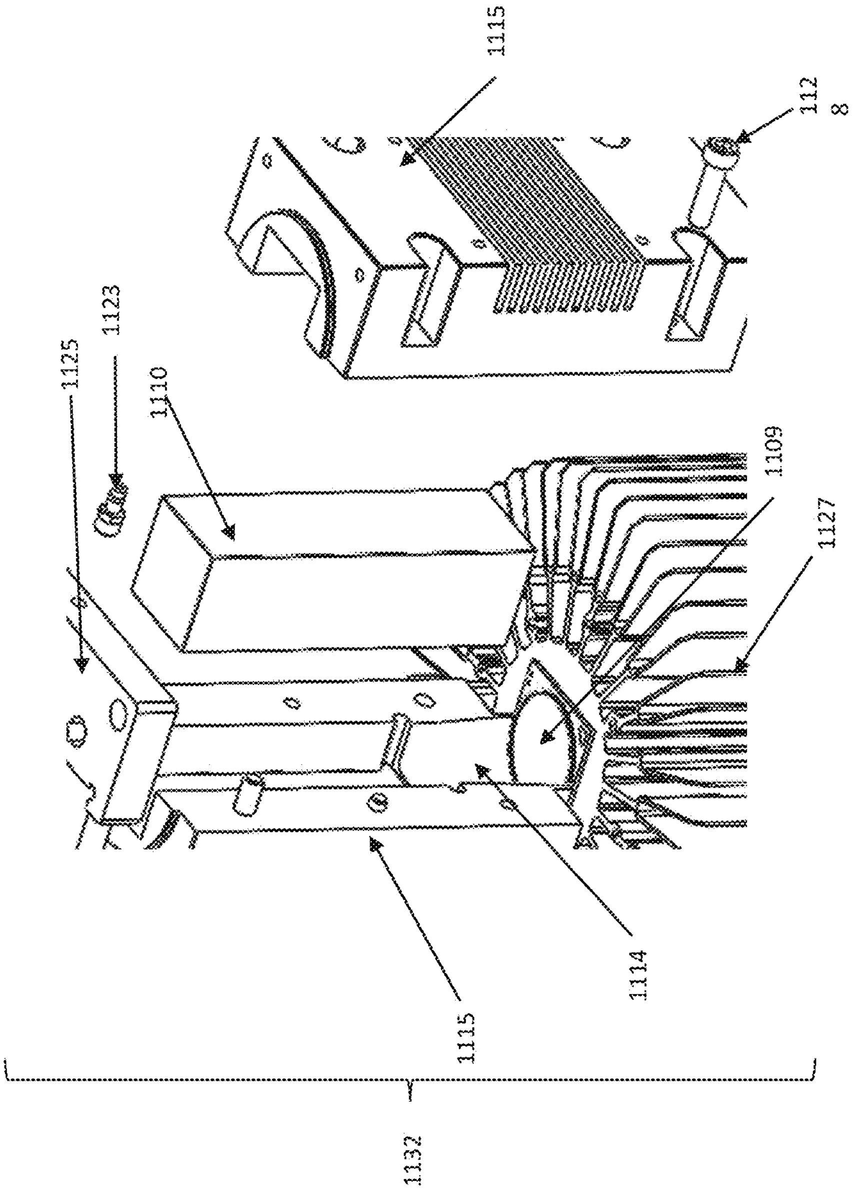
FIG. 11 is an exploded view of a diagram of a thermal cycler according to one embodiment.

FIG. 11 provides a further exploded view of FIG. 10, depicting a portion of device 1132. One of secondary heat sinks 1115 is in place over photo-thermal light source 1109 and light source heat sink 1127. The internal surface of the secondary heat sinks 1115 located between the photo-thermal light source 1109 and the lower (entry) surface of transparent heat sink 1110 are provided with a reflective film or polished surface 1114, such that when secondary heat sinks 1115 are attached together, the internal surface having a reflective film or polished surface 1114 acts as a light guide directing light from the photo-thermal light source 1109 into the entry surface of the transparent heat sink 1110. Secondary heat sinks 1128 can be fastened together using fasteners 1128. Vacuum connection port 1123 is present on cartridge interface plate 1125 to provide direct contact or thermal communication of a gasket and/or cartridge with the transparent heat sink 1110.

In addition, one important aspect of this system is a method of temperature measurement and a corresponding feedback control loop due to the rapid heating and cooling cycles. An efficient means to both measure and control the cartridge temperature in a minimally thermally intrusive way is critical. For example, a large thermocouple can hamper the efficient thermal contact between the cartridge and the transparent heat sink. A non-contact method for temperature sensing is preferred. However, most polymers are opaque in the range of typical infrared thermometers and the temperature of the top of the microfluidic cartridge may vary greatly from the heated zone at the bottom. The problem is overcome in the proposed system, shown in FIG. 12, by careful design of the transparent heat sink 1210. In the case of using one or multiple photo-thermal heat sources 1209 (e.g., LEDs), a cavity can be located at the bottom of the heat sink for placing an infrared thermometer (IR sensor) 1229. The one or more photo-thermal heat sources 1209, transparent heat sink 1210 and IR sensor 1229 are surrounded by the secondary heat sink 1215. The IR sensor 1229 performs as a thermometer which can then view through the transparent heat sink 1210 (due to it being transparent in the IR range) and image the heated area of the cartridge 1201 most critical to performance. Multiple The IR sensor 1229 is supplied with a filter to allow only the IR range of light through so it is not affected by the heating light, supplied in the visible to UV range. Multiple IR sensors 1229 could be used to monitor key areas in a similar manner. The addition of the LEDs 1209 acts to increase the total power. This allows the heated area to become larger as well. The configuration can be expanded to use any number of LEDs 1209, with the shape and form of the transparent heat sink 1210 being altered accordingly. Control systems that can be useful in the present disclosure to provide temperature measurement and feedback include, for instance, those described in U.S. Published Patent Application No. 20120052560, the disclosure of which is incorporated herein by reference in its entirety.

The present disclosure additionally provides for the systems and methods for thermocycling a microfluidic cartridge wherein a flexible heat spreader is used to seal the channels of the microfluidic cartridge. The flexible material is placed over the open channels of a microfluidic device, as shown in FIG. 2, and when contacted by a heat sink or other solid heating and cooling source that applies pressure to the flexible material, it flexes and presses against the open channels, thereby sealing the channels as long as the pressure source is in place. The resulting thermal cycling device or system therefore does not require use of a bonding process between the cartridge and the seal substrate.

Such a flexible heat spreader as is provided herein can be used with any contact-type thermal cycling methods, such as those described herein or otherwise known to those of skill in the art. The use of a flexible heat spreader therefore requires no bonding of a cover or seal on the microfluidic cartridge, and necessarily avoids common bonding-related problems such as delamination or bubble generation. In addition, the present disclosure provides both a simplified process for thermal cycling and cartridge manufacture. Cartridge configurations can be simplified based on the lack of a need for a sealed top, resulting in time and cost savings. Materials that are suitable for use as a flexible heat spreader according to the present disclosure will include graphene, and thin film plastics, although those of skill in the art will understand additional materials that can be suitable alternatives. The use of a heat sink such as the sapphire block described herein to provide the pressure to deform the flexible heat spreader and seal the channels, also provides the additional benefit assisting with providing thermal uniformity across the heat spreader, such that even materials that may not otherwise be considered as a heat spreader can be used. Further, the flexible heat spreader can be used to seal channels on a microfluidic cartridge to be used with any thermal cycling system wherein means for applying and maintaining pressure to the flexible heat spreader in the direction of the microfluidic cartridge is provided.

EXAMPLES

Example 1: Feasibility Experiment

An experiment was performed to prove the viability of the concept. FIG. 8 shows the experimental setup. A sapphire cube was obtained and one side was fine ground to diffuse the surface and allow it to act as a light cube. The outside of the cube was covered in a reflective film to promote additional internal reflection of light. The cube was then covered in a thermal adhesive before installation into the aluminum heat sink. The purpose of the aluminum heat sink was to act as a guide for the light exiting the LED (which was round) into the cube (which was rectangular). The heat sink also acted to thermally stabilize the temperature of the sapphire cube and help to maintain it in an isothermal state during heating and cooling. A depiction of the final setup is shown in FIGS. 9-11.

Figure 17:
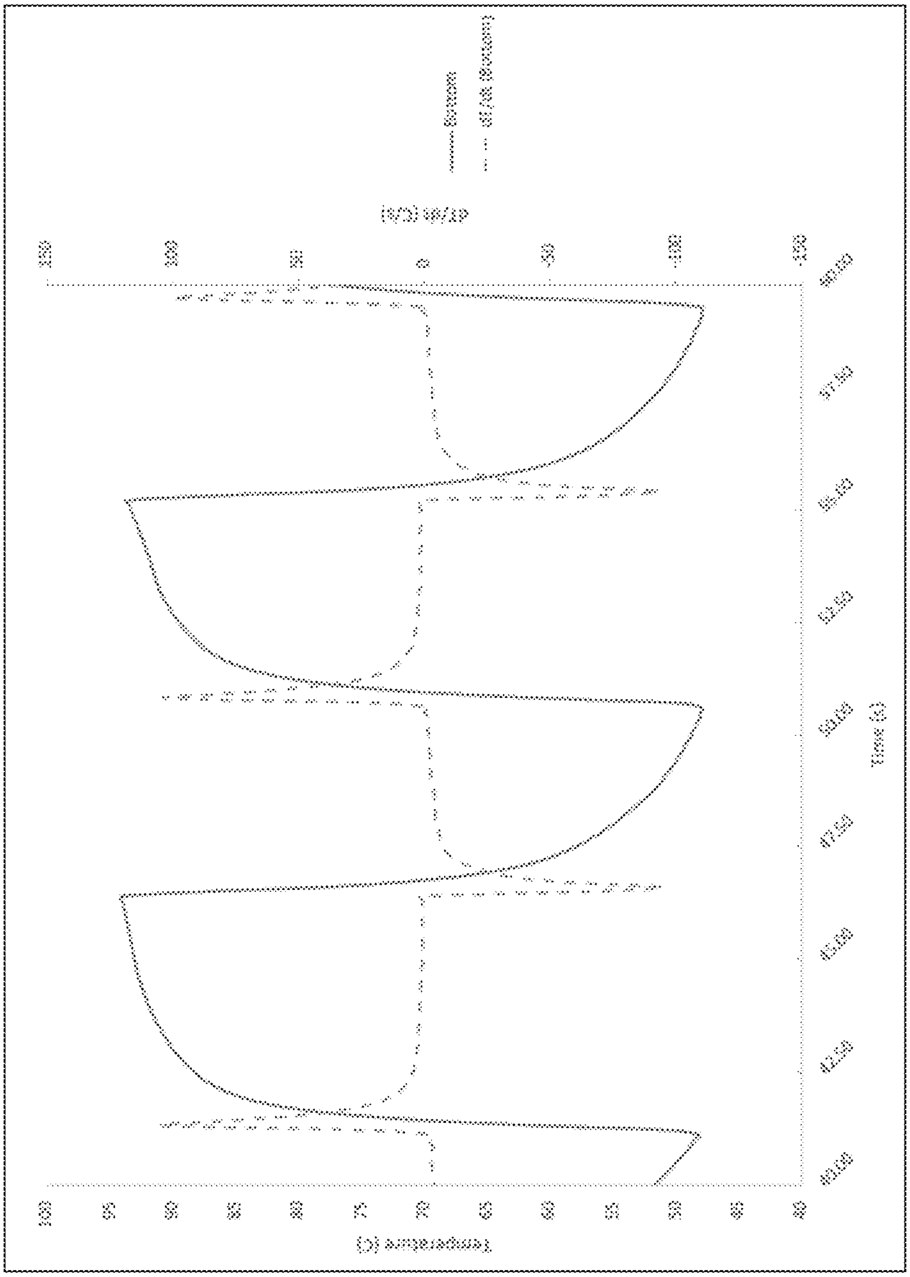
FIG. 17 is a chart showing experimental results of heating rate and temperature over time for the bottom thermocouple.
Figure 18:
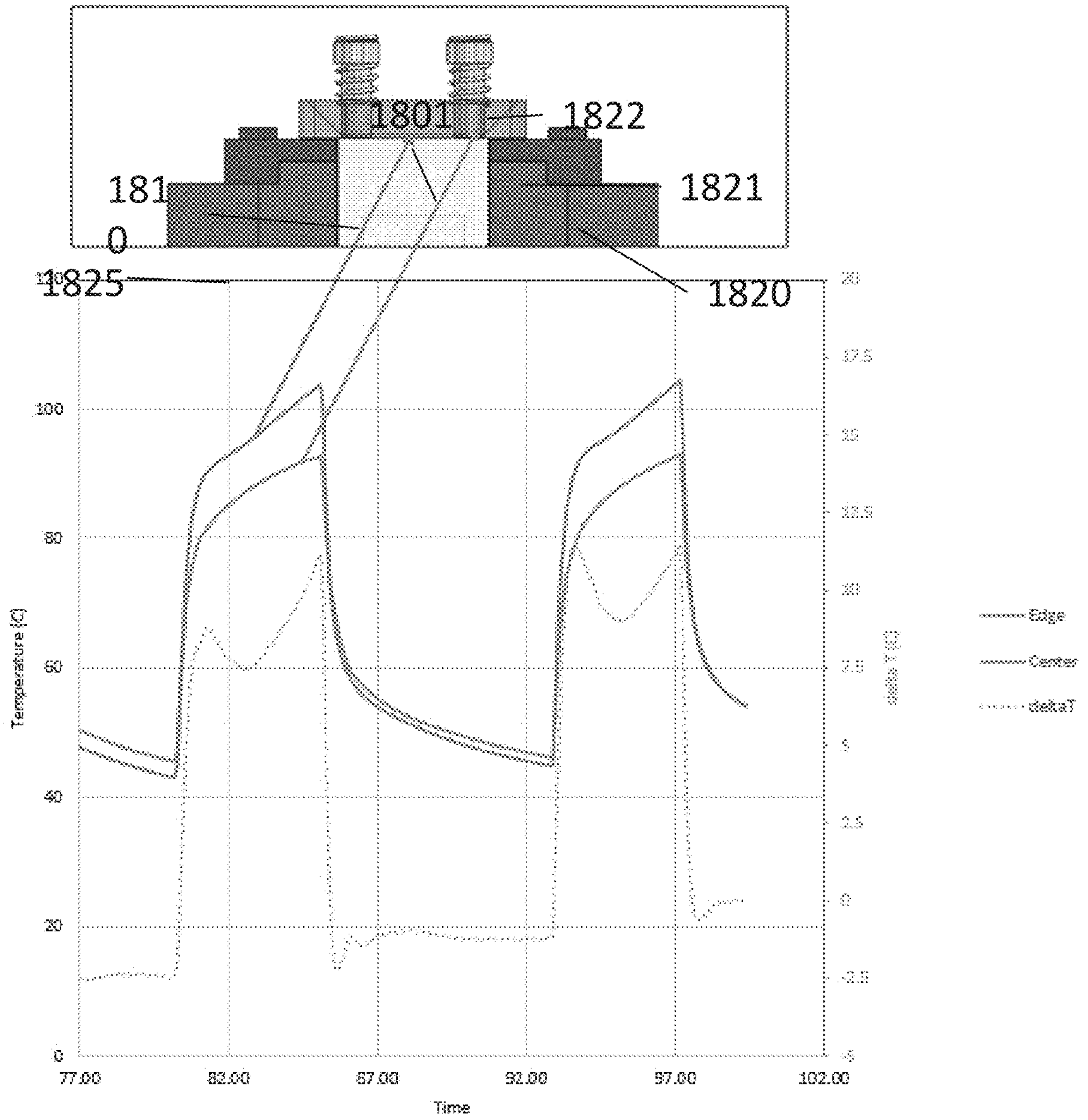
FIG. 18 is a chart showing heating rate and temperature over time for the edge and center of the microfluidic cartridge as correlated to a diagram of a thermal cycler according to one embodiment.

A 1 mm thick microfluidic cartridge was fabricated with a 50 um black aluminum lid, which acted as a light-absorbing surface. A small thermocouple was placed at the interface between the cartridge and the sapphire cube. Thermo-cycling was then performed by turning the LED on to heat the cartridge; when the LED was turned off, the cartridge was allowed to cool passively via the sapphire heat sink. The LED was not run at the 9.38 W/cm2 and was outputting a much lower thermal flux in the range of 2-4 W/cm2. The results for heating/cooling rates and uniformity are shown in FIG. 17 and FIG. 18, respectively. The maximum heating and cooling rates were found to be around 100 degrees Celsius per second (C/sec). The average heating and cooling rates between 60-80 C were 50 C/sec and 35 C/sec, respectively. The uniformity was seen to be around +/−12 C at the denature temperature of 95 C, but the more critical annealing temperature of 55 C showed +/−0.1 C-2.5 C, which is close to the preferred target range of +/−1 C.

Figure 15:
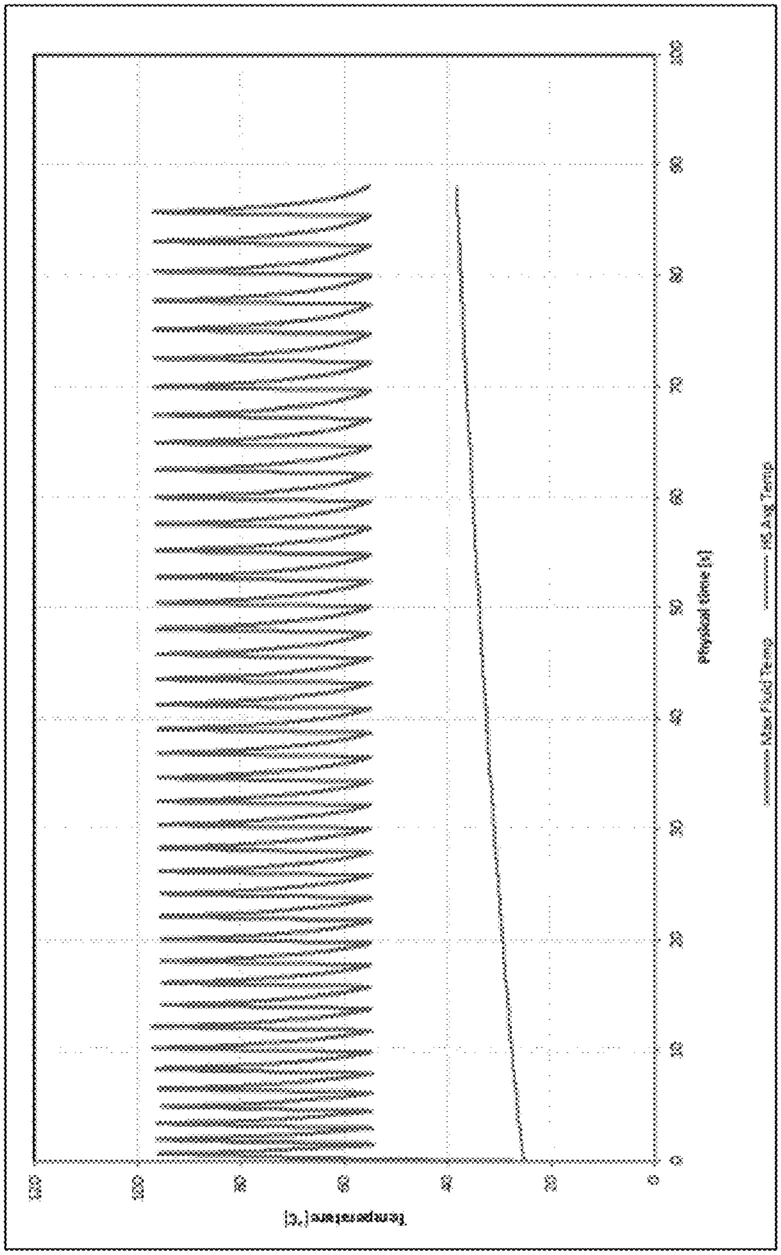
FIG. 15 is a chart showing a simulated 2 step PCR thermal profile.

FIG. 16 summarizes the results from the experiment described above compared to the simulated values (simulated 2 step PCR thermal profile is depicted in FIG. 15). Given the lower flux, the heating rate was still significantly faster than most methods, and the simulated conditions show that with optimization the heating rate could be faster. In addition, the use of a thermocouple was not ideal, as the physical placement of the thermocouple affects the thermal contact resistance between the cube and the microfluidic cartridge. A non-contact method of temperatures measurement would be preferred and could improve the heating, cooling rate, and uniformity as was described in earlier sections.

Example 2: Optical Simulation and Measurement

Modelling was used to predict the thermal and optical behavior of the proposed thermal cycling system. Two distinct phases were used: the first focused on optimizing optical performance and throughput and the second on determining optimum thermal performance.

Figure 19:
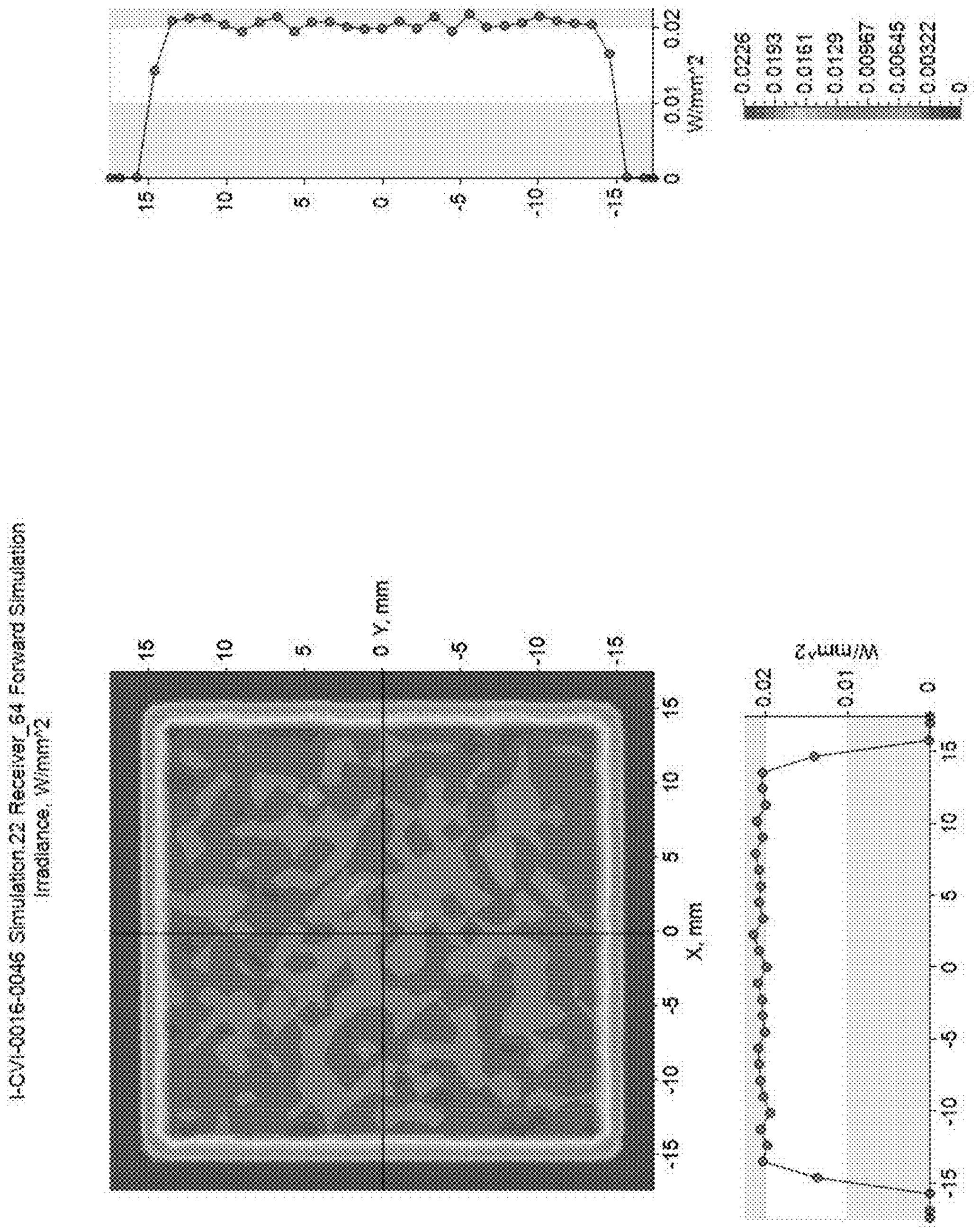
FIG. 19 is a chart showing the light guide exit surface irradiance for a diffuse surface with specular film on transition region.

To determine the optical effects, LightTools Illumination (Synopsys Inc.) was used to model the ray tracing behavior of several proposed configurations, the results of which are summarized in Table 1. The key input was the total power (W) supplied by the LED at a given current. The outputs used for evaluation were the incident power (W) at the outlet of the light guide, the efficiency (Incident power/input power), and the percent uniformity normalized against the maximum irradiance. It was shown that total internal reflection (TIR) was achieved using the system and that total efficiency was improved by approximately 5% with a higher reflective finish on the inlet round-to-square transition region based on several values of reflectivity being simulated. A diffuse finish on the outlet was approximated by defining the outlet of the light guide cube as a Lambertian Scattering surface and showed an improved uniformity of approximately 2.5%. However, the results were close to the margin of error or noise level of approximately 3% for the simulation, which implies that the results may in fact have been better than shown, but this could not be determined due to inherent uncertainty. FIG. 19 and FIG. 13 show exemplary results for the output irradiance plot and ray paths respectively for the specular film on transition region (R=0.98) plus diffuse surface condition (R=0.2, T=0.8).

TABLE 1

LightTools Simulation Summary

| | | New Assembly | | | | | |
|---|---|---|---|---|---|---|---|
| | Units | Bare Al | 3M Specular Film | 3M Specular Film + diffuse | Perfect Mirror | All Sapphire Version | Old Assembly |
| Incident Power | W | 18.1 | 20.1 | 18.0 | 21.0 | 22.3 | 18.2 |
| Total Supplied by LED | W | 26.5 | 26.5 | 26.5 | 26.5 | 26.5 | 26.5 |
| Efficiency | % | 68.1% | 75.8% | 67.9% | 79.2% | 84% | 68.7% |
| Uniformity | % | 5.0% | 5.3% | 2.6% | 3.9% | 1.3% | 6.7% |

Figure 20:
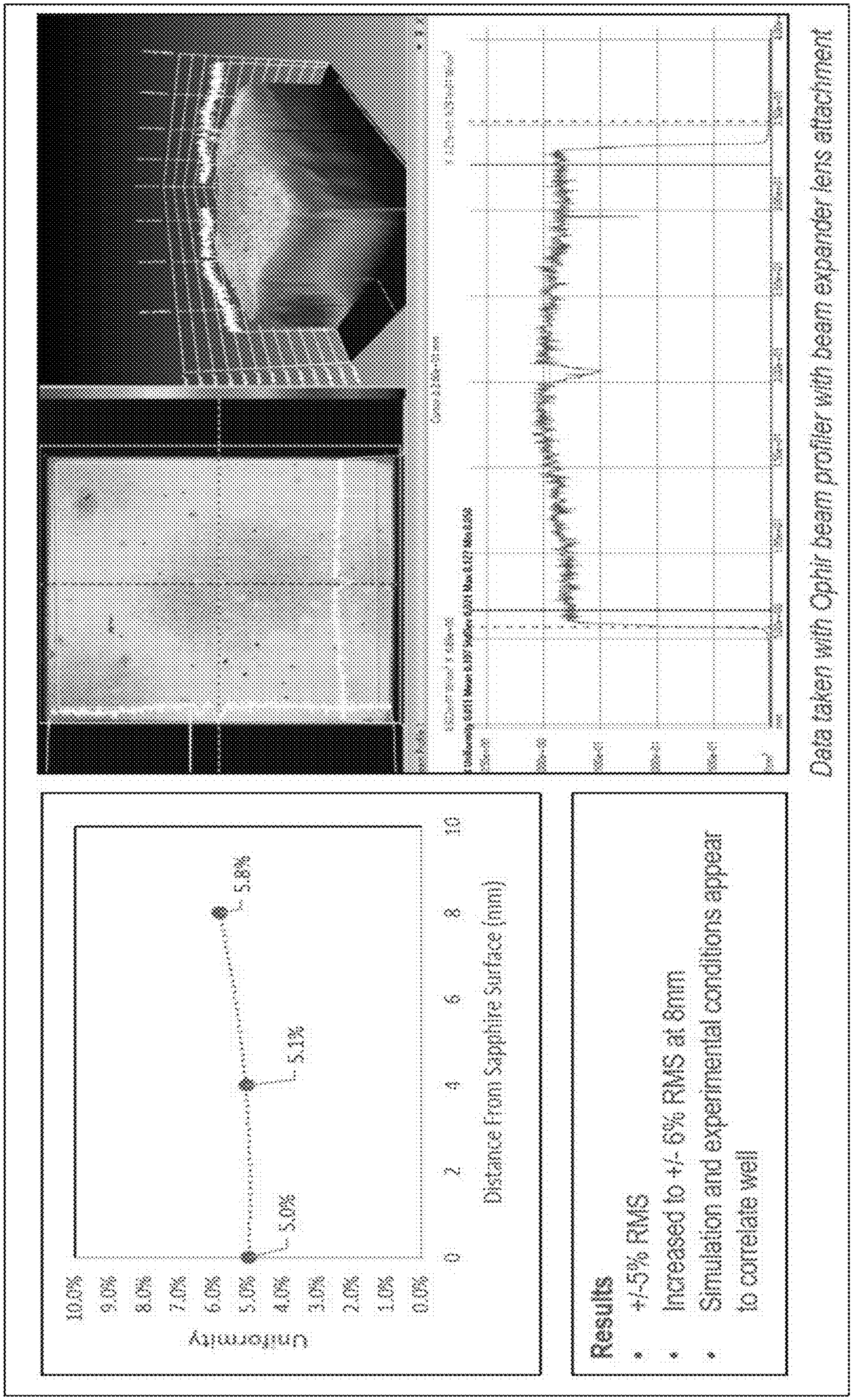
FIG. 20 are charts showing the optical uniformity characteristics of a thermal cycling system according to one embodiment.
Figure 21B:
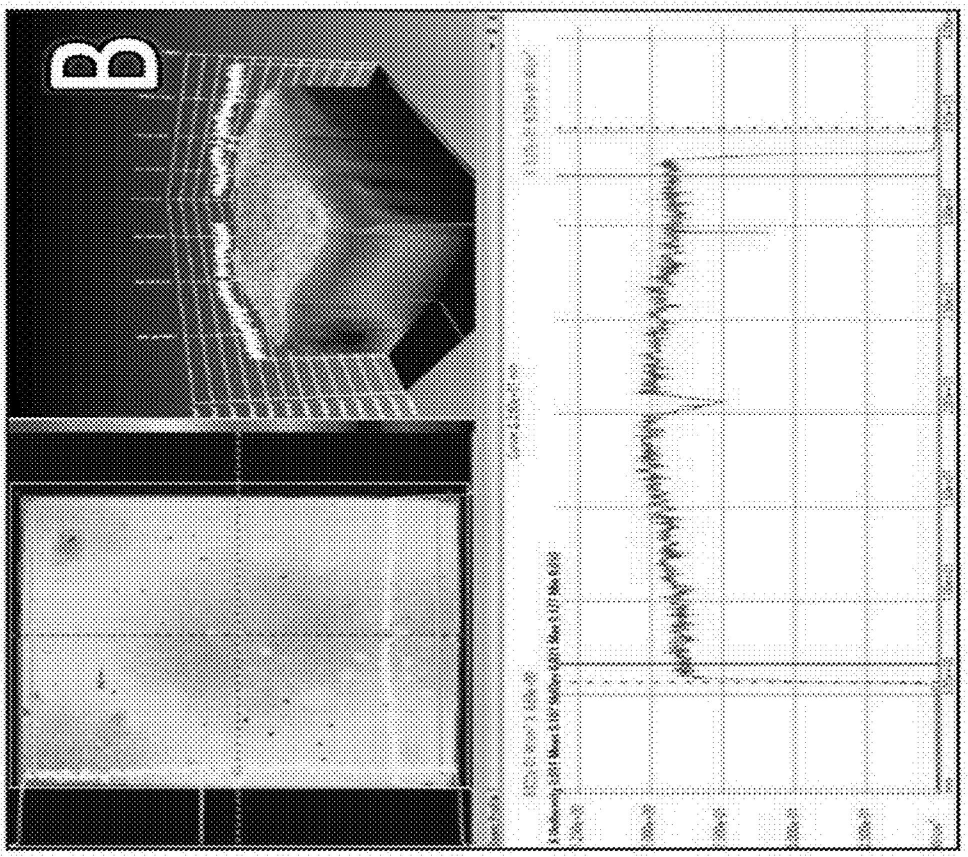
FIG. 21A-B are charts comparing the optical uniformity of a hollow light pipe to a thermal cycling system according to one embodiment.
Figure 21A:
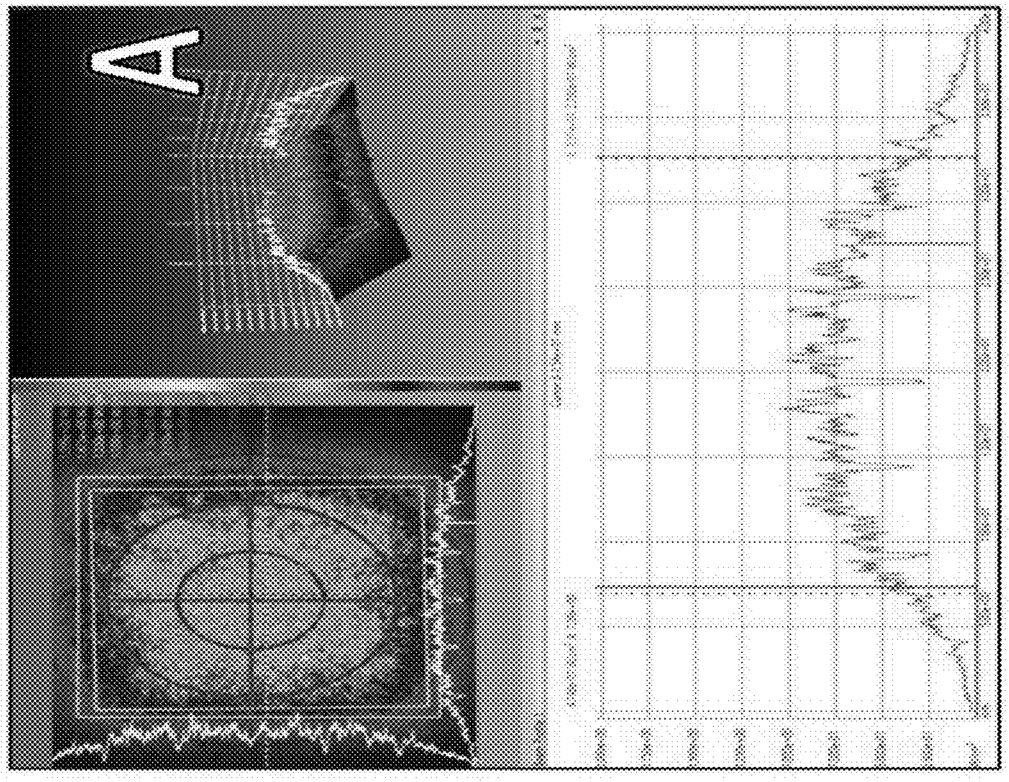

After optical simulation showed that the sapphire version had the highest efficiency and lowest percent uniformity when normalized against the maximum irradiance, a 30×30×100 mm Sapphire cube was made with a 300 grit ground diffuse exit surface. The cube was made to the configuration from the simulation that provided the highest uniformity and was installed in the aluminum heat sinks on the thermal cycling system. A CCD based beam profiler (Ophir Optics) was used to measure the optical uniformity, and BeamGauge (Ophir Optics) was used to evaluate the data. Results are shown in FIG. 20, which experimental results correlated well with the simulation results. This data from the sapphire cube was then compared to the resulting optical uniformity using a hollow light pipe, as provided in FIG. 21 (A: hollow light pipe; B: sapphire cube). The uniformity from the sapphire cube was significantly improved over using the hollow light pipe.

Figure 22:
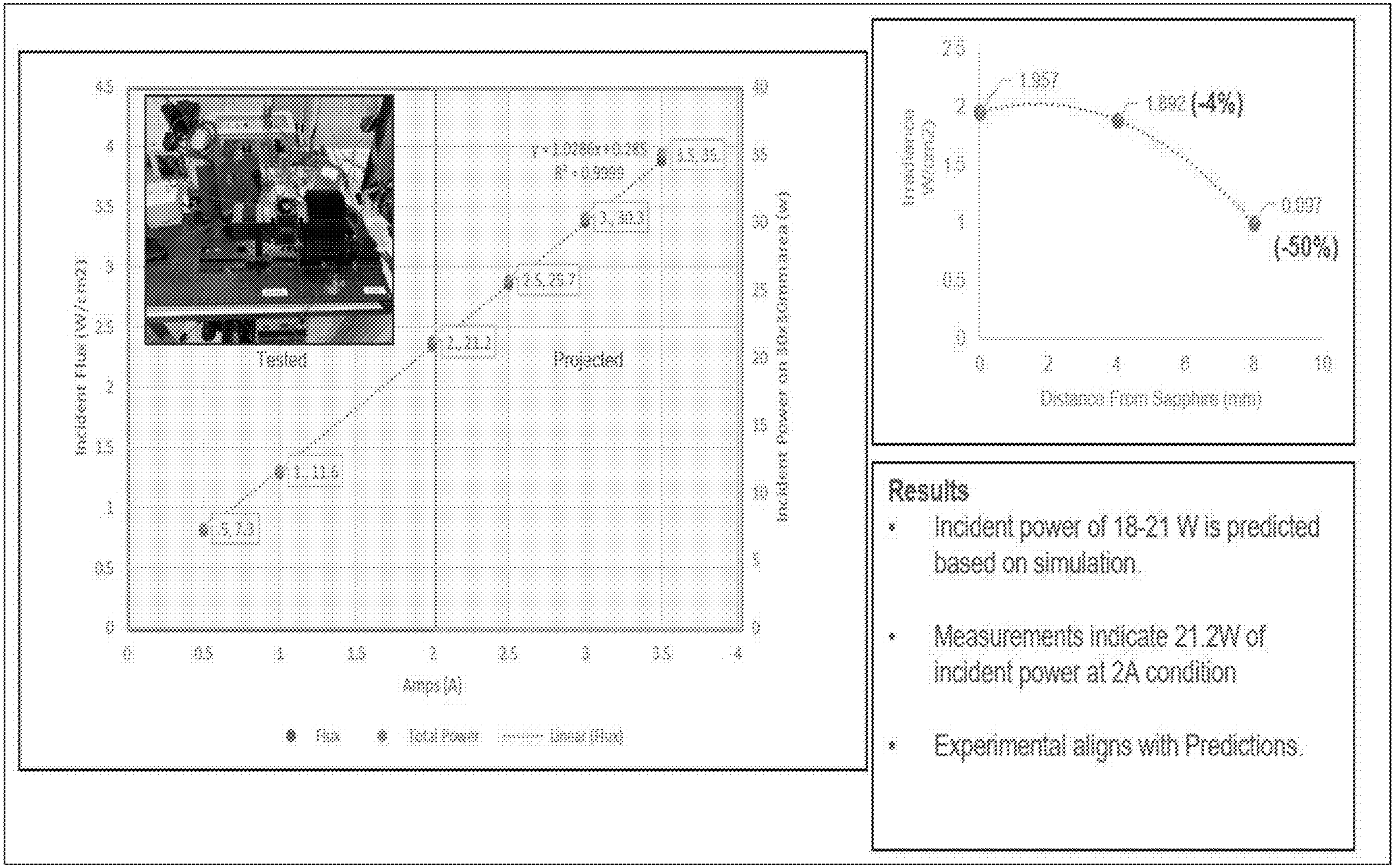
FIG. 22 is charts depicting irradiance vs. input current vs. distance for a thermal cycling system according to one embodiment.

The output irradiance of the thermal cycling system using the sapphire cube was also measured using a photodiode based power meter (Newport 2936-R, Newport Corporation). The results of the measurements are shown in FIG. 22. It was seen that both the output irradiance and uniformity matched the simulated values within about 5%.

Example 3: Thermodynamic Simulation

A simulation was performed that focused on thermal evaluation of the system. This was done by modeling and simulating the transient conjugate heat transfer behavior in Solidworks Flow Simulation (Dassault Systemes). The thermodynamic material properties used are shown in Table 2.

TABLE 2

Thermodynamic Material Properties

| | Thermal Conductivity | Density | Specific Heat Capacity | Volumetric Heat Capacity | Thermal Diffusivity |
|---|---|---|---|---|---|
| Symbol | k | ρ | Cρ | ρCρ | α |
| Units | W/mK | $Kg/m^3$ | J/kgK | $J/m^3K$ | $mm^2/s$ |
| Aluminum (AL 6063) | 160 | 2700 | 889 | 2400 | 66.7 |
| Optical Sapphire | 40 | 3980 | 750 | 2985 | 13.4 |
| Polycarbonate | 0.16 | 1010 | 1923 | 1942 | 0.082 |

Figure 23:
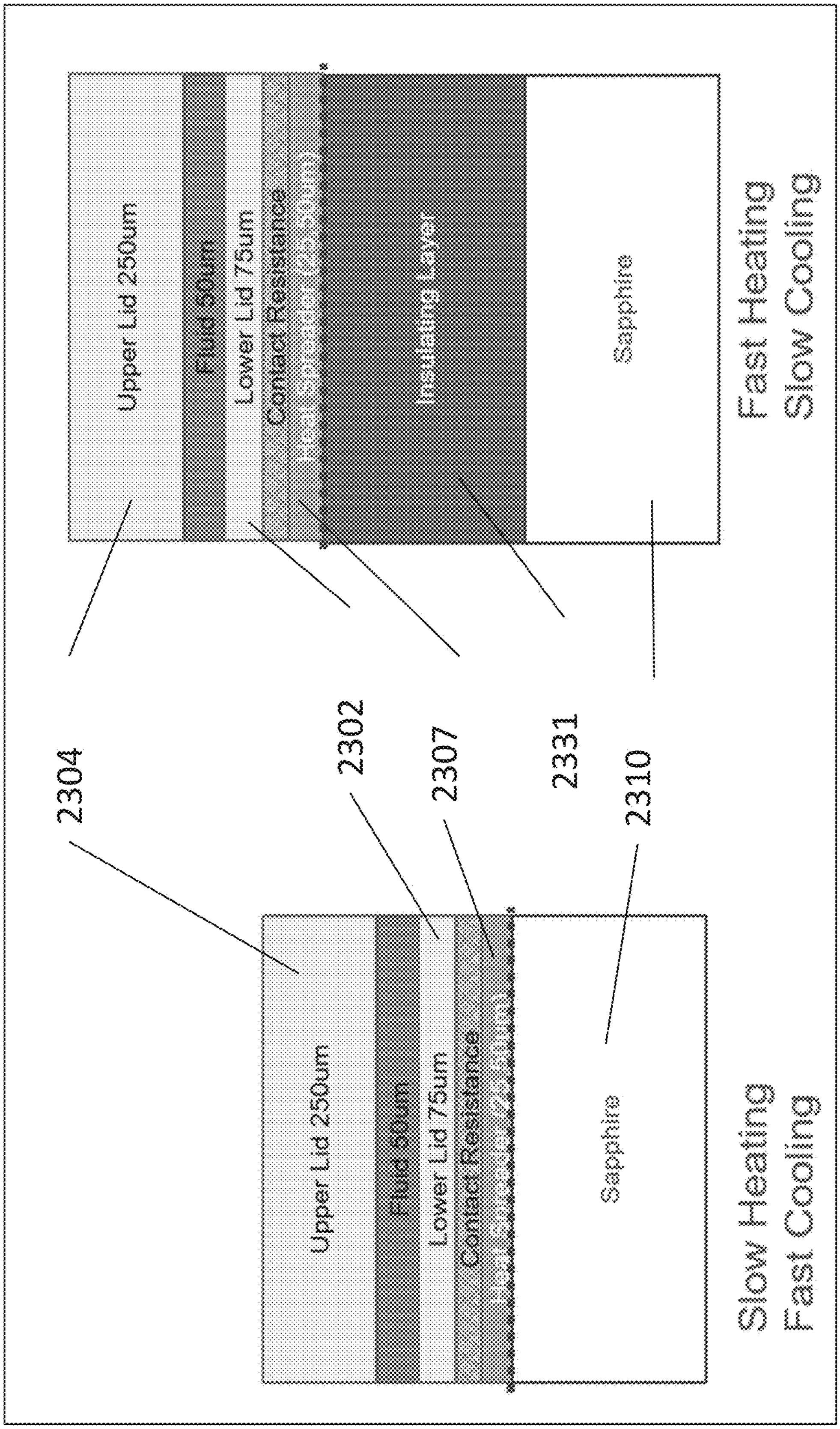
FIG. 23 is thermal model block diagrams for slow heating with fast cooling and for fast heating with slow cooling.

The modelling focused on extreme cases in the system, e.g, where the heat spreader or light absorbing layer 2307 is in direct contact with the sapphire 2310 or where there is a large transparent insulating layer 2331 between the heat spreader or light absorbing layer 2307 and the sapphire 2310. A diagram of these conditions is provided in FIG. 23. Under the conditions including the insulating layer, it was expected that there would be very fast heating due to the added thermal insulation, but slow cooling. Under the conditions including direct contact between the heat spreader or light absorbing layer and the sapphire, it was expected to have very fast cooling as heat would pass to the sapphire more readily, but very slow heating for the same amount of incident power. Therefore, the conditions need to be optimized to determine the optimal thermal circuit for a given input irradiance.

Figure 24:
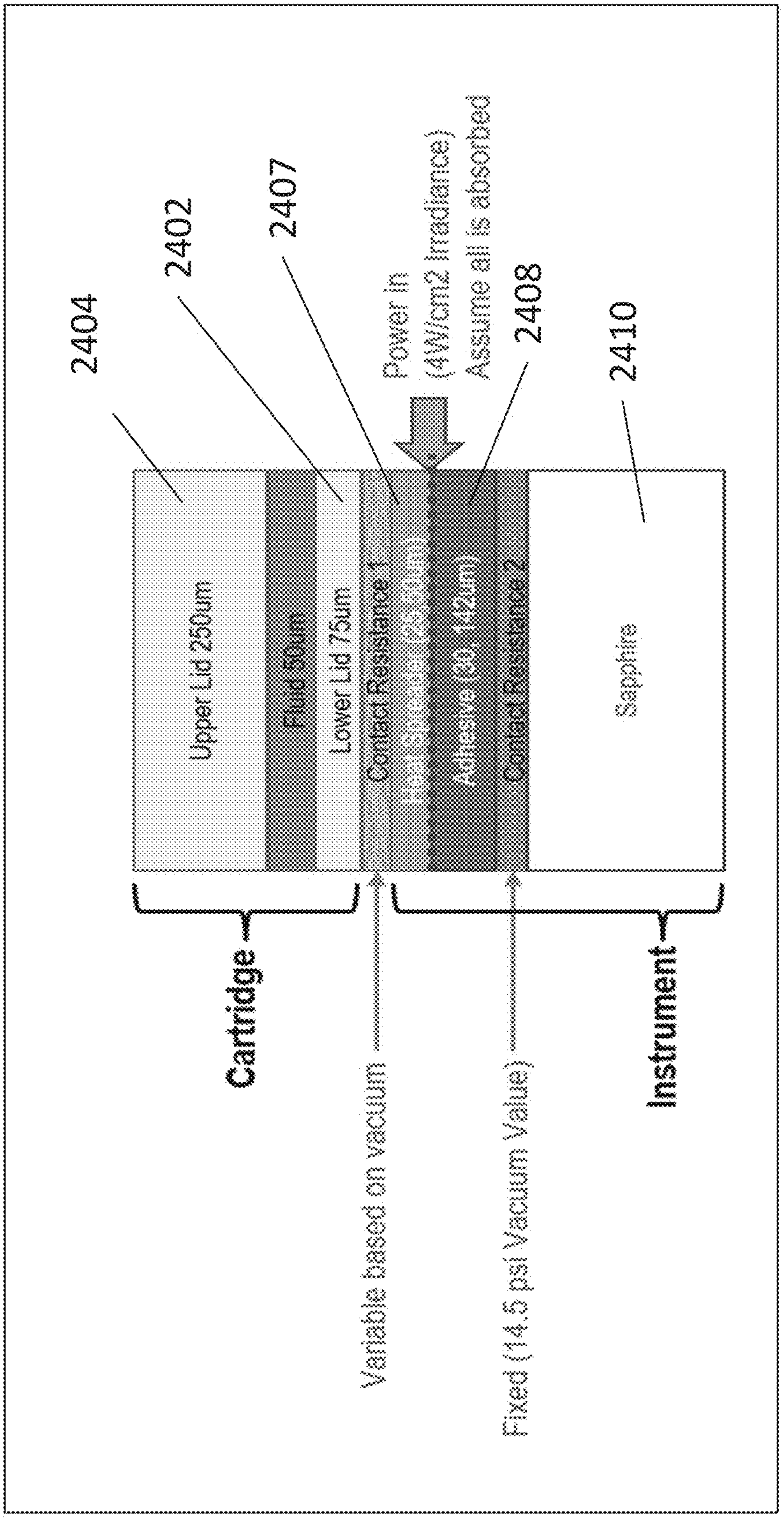
FIG. 24 is a diagram depicting a practical implementation of a thermal cycling system used for 1D simulation.
Figure 25:
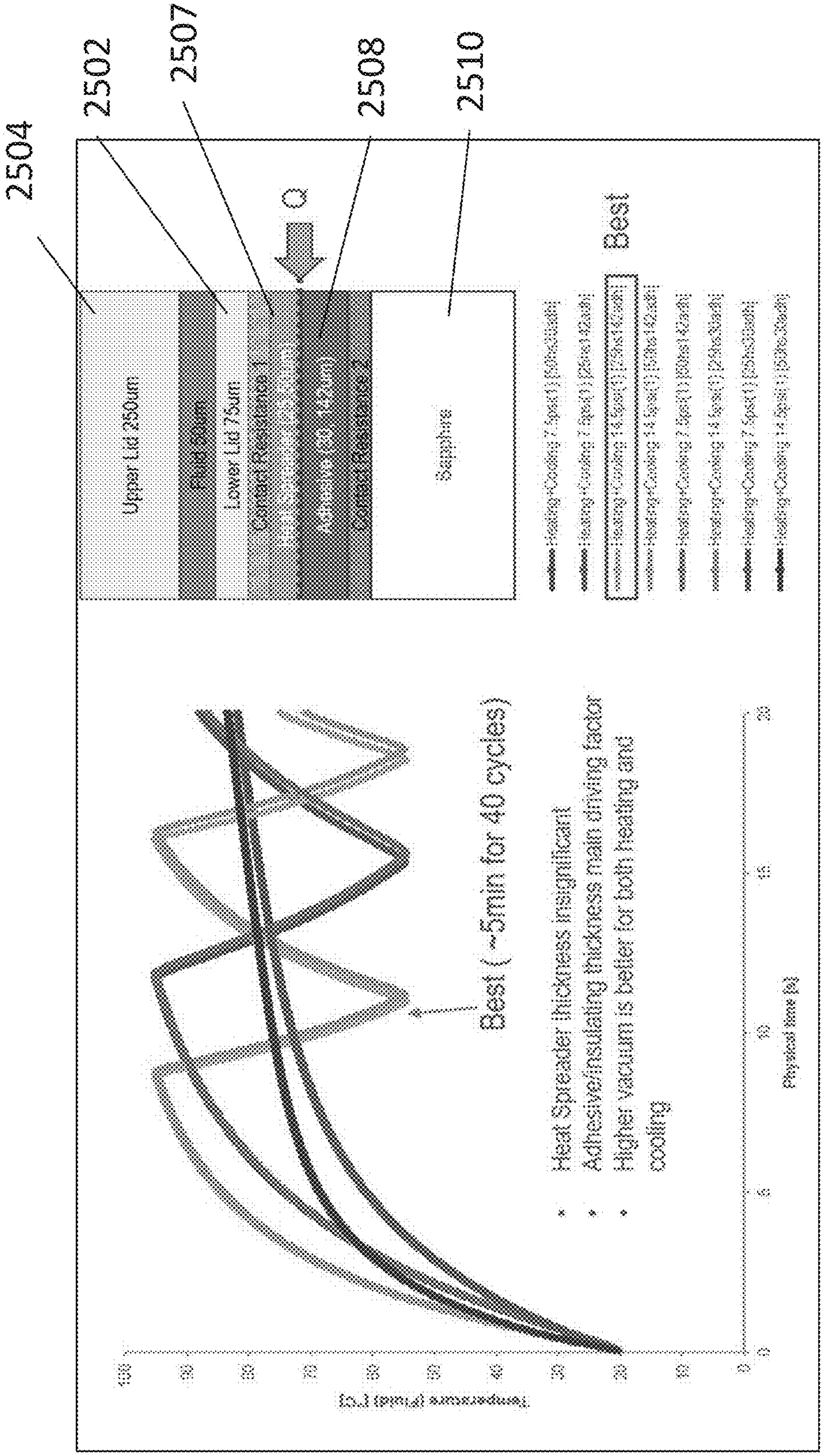
FIG. 25 is a chart depicting thermal simulation results for various configurations of thermal cycling systems.
Figure 26:
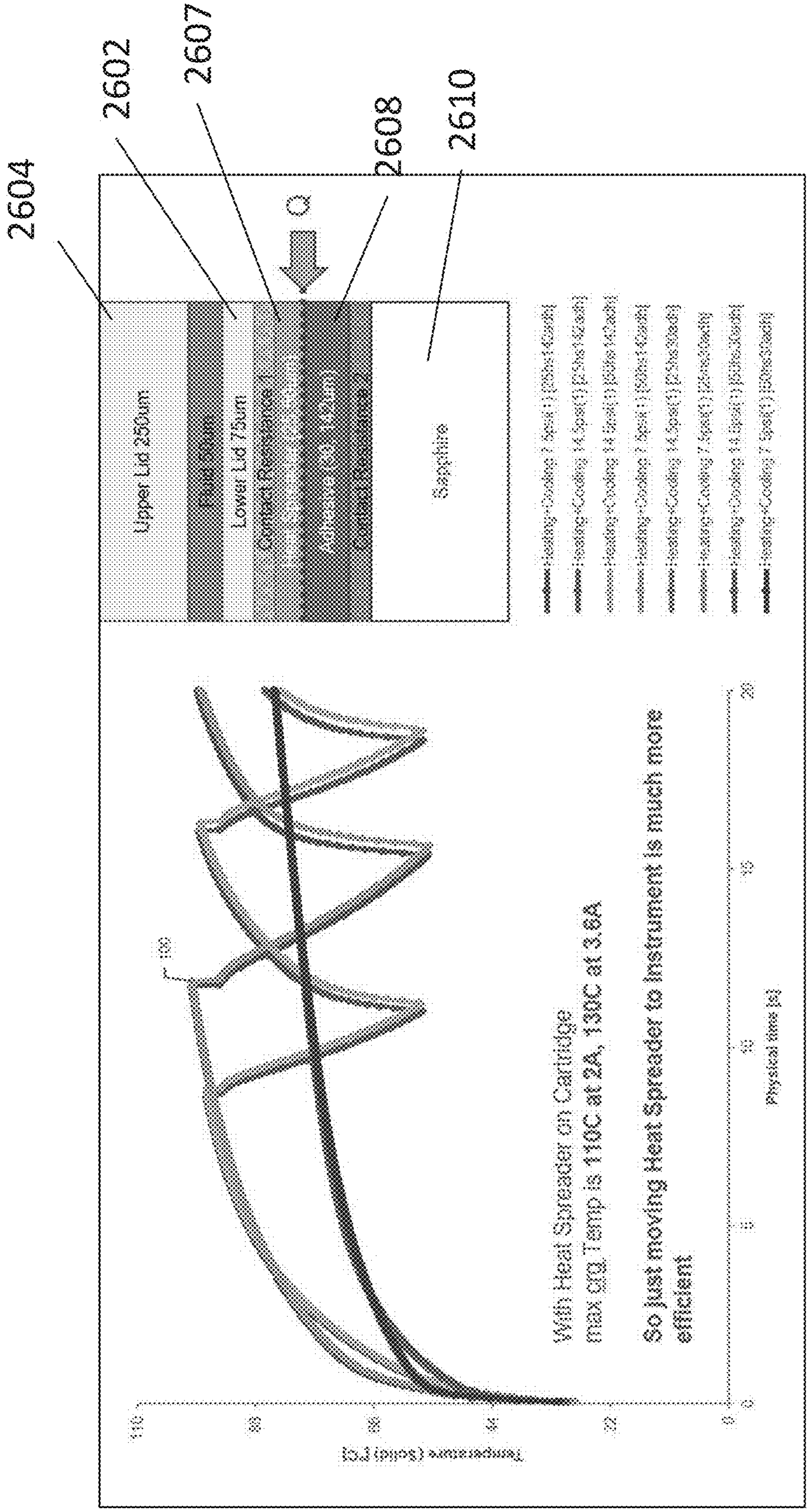
FIG. 26 is a chart depicting simulated maximum cartridge temperature for various configurations of thermal cycling systems.

The practical model that was used for the one-dimensional simulation is provided in FIG. 24. The input variables were the contact resistance between the cartridge (made up of upper lid 2404 and lower lid 2407) (in order to determine the effect of vacuum holding force), the thickness of the heat spreader/light absorbing layer 2407, and the thickness of the adhesive/insulating layer 2408. The results of the simulation are summarized in FIG. 25. It was seen that lower contact resistance, or a higher vacuum holding force, provided both better heating and cooling due to better thermal contact. A thinner heat spreader 2507 and lower thermal mass provided a very small benefit in terms of speed compared to the other factors. The largest impact on performance was the insulating layer/adhesive 2508 thickness. FIG. 26 provides the results for the maximum cartridge temperature for the same set of simulations. The presence of the heat spreader/light absorbing layer 2607 on the instrument resulted in a stable maximum temperature of the cartridge during heating which did not rise above 100° C.

Example 4: Thermodynamic Testing

After the thermodynamic simulations determined the optimal resistive circuit construction, several configurations were made to confirm the findings. FIGS. 9-11 depict the prototype design as used for further testing. FIG. 14 provides the design of the vacuum holding systems. It was found that a soft 30-40A durometer silicone gasket 1424 performed best with a compression set of approximately 25-30%.

Figure 27:
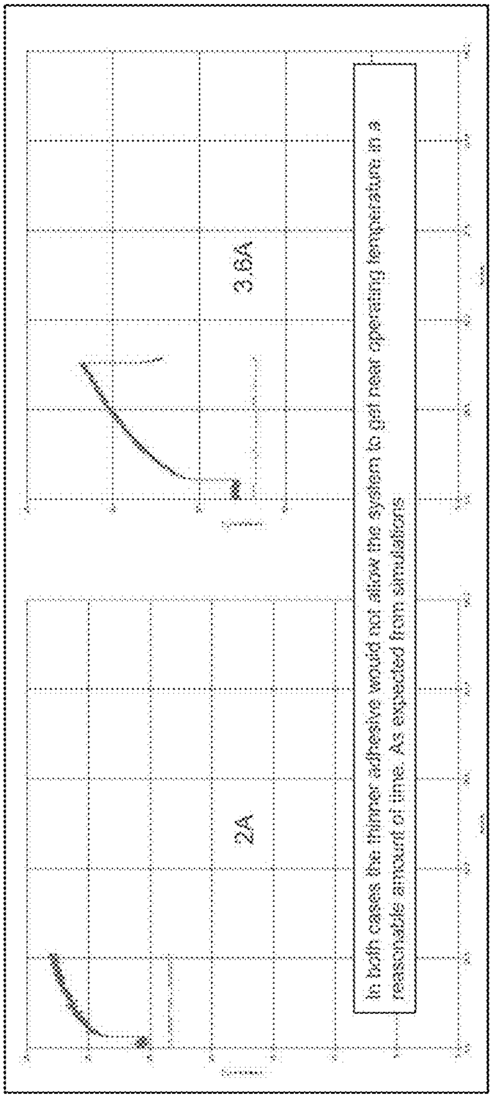
FIG. 27 is two charts depicting heating profiles for a thermal cycling configuration according to one embodiment using a 25 μm thick adhesive.
Figure 33:
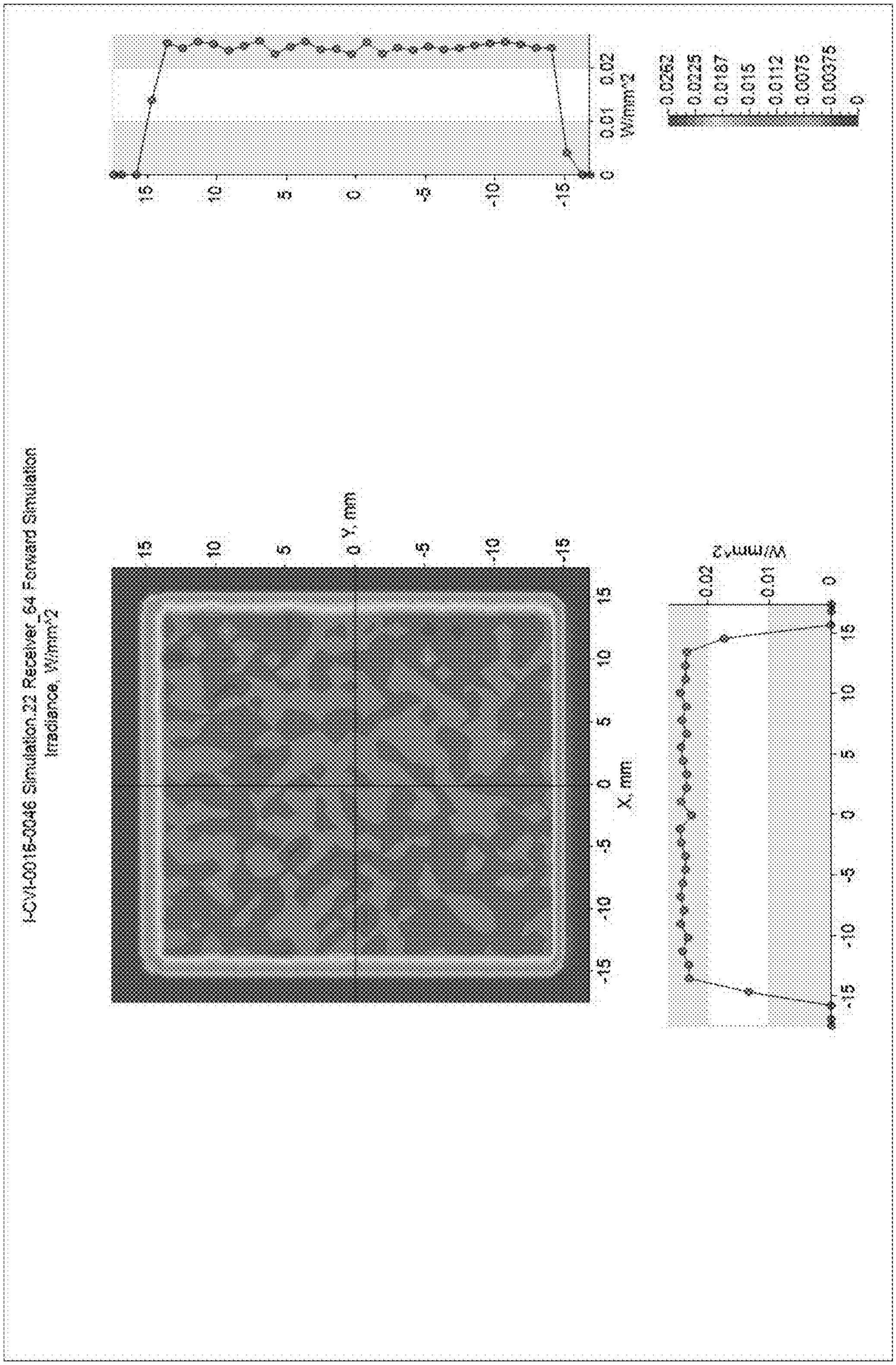
FIG. 33 is a simulated infrared imaging plot for one embodiment having a perfect mirror transition.
Figure 34:
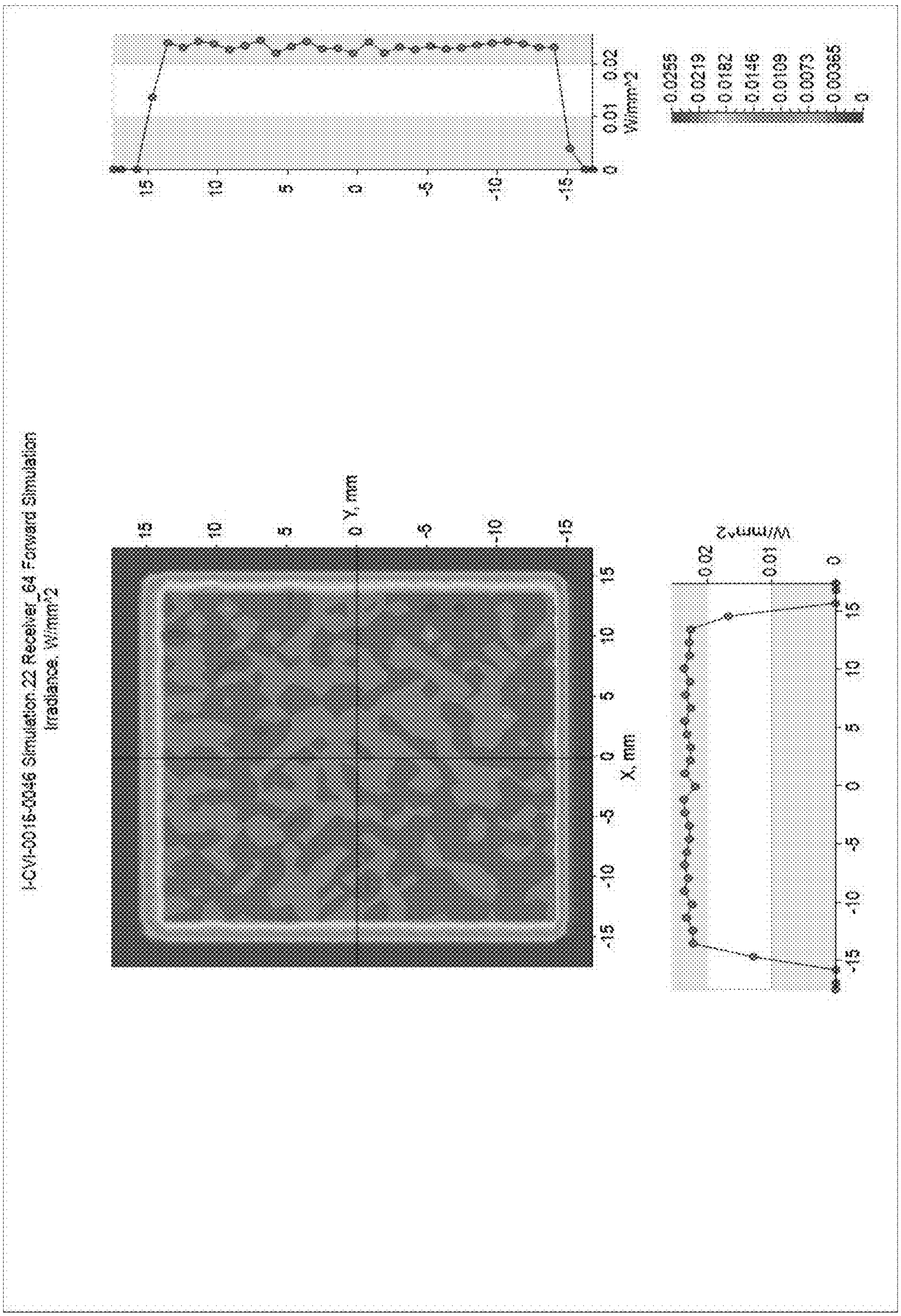
FIG. 34 is a simulated infrared imaging plot for one embodiment having 3M specular film on transition.
Figure 35:
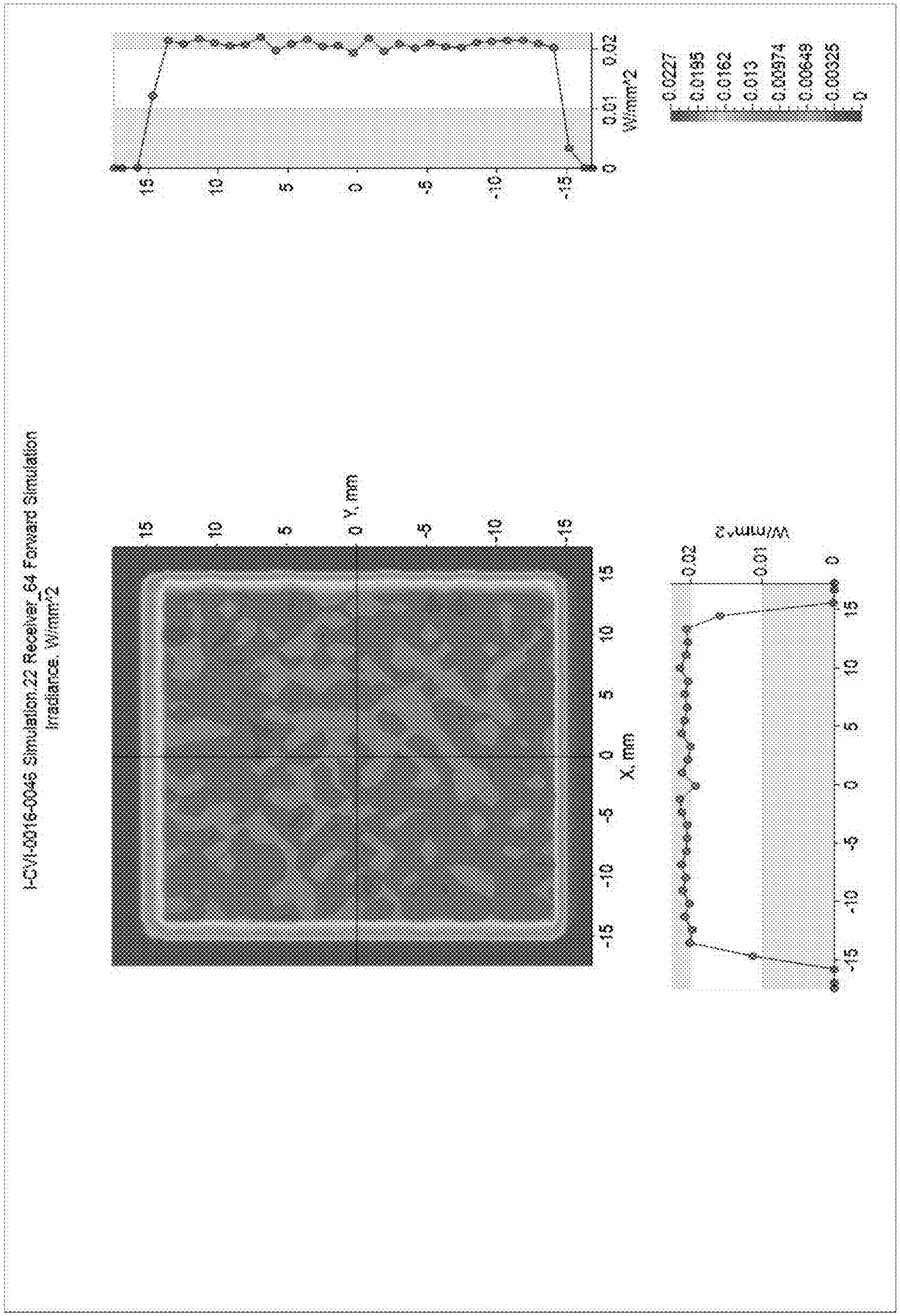
FIG. 35 is a simulated infrared imaging plot for one embodiment having bare machined aluminum.
Figure 36:
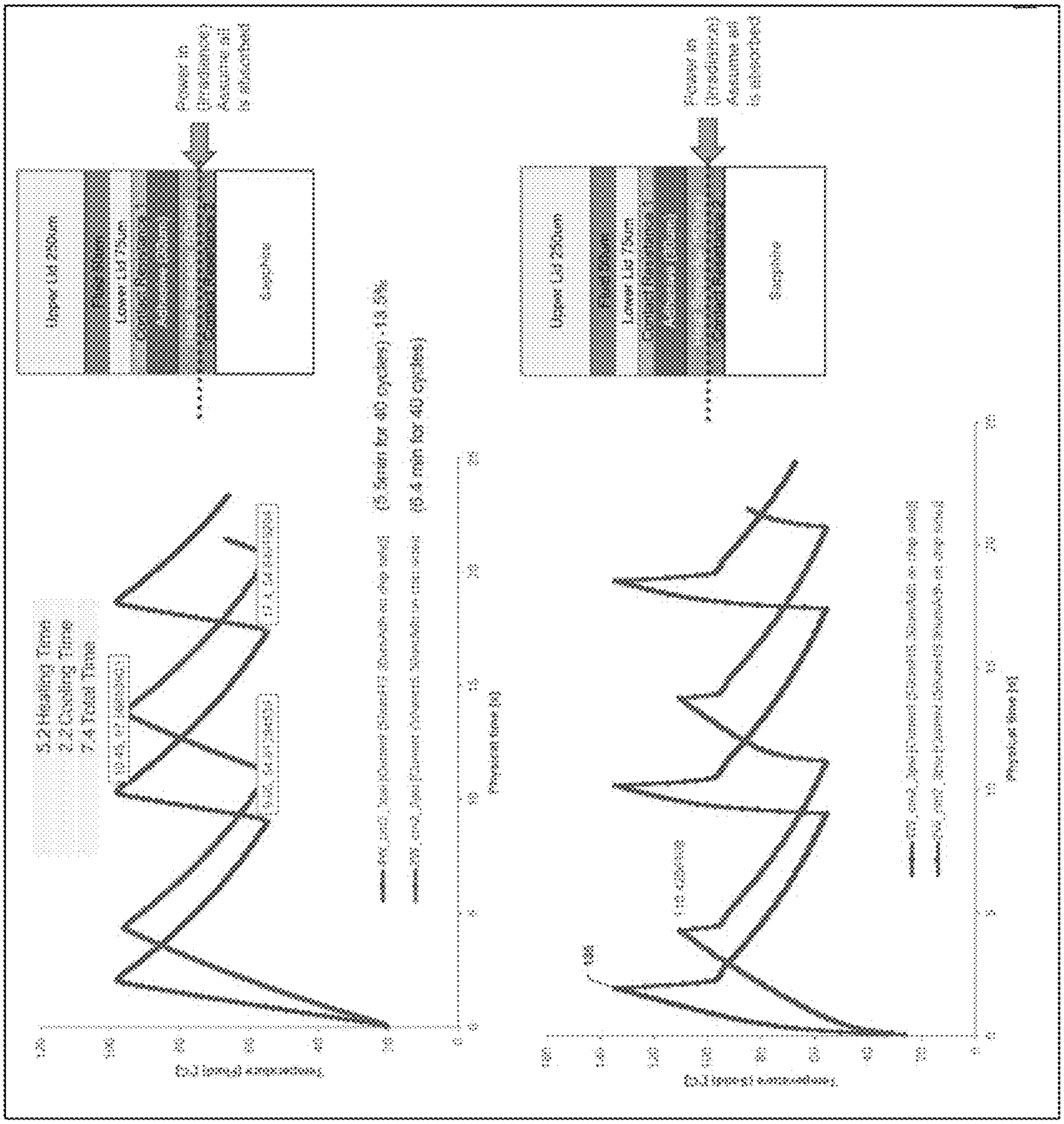
FIG. 36 is simulated charts showing fluid average temperature vs. time and max cartridge temperature vs. time for a thermal cycler having a heat spreader/light absorber mounted on a microfluidic chip according to one embodiment.

A heat spreader thickness of 25 μm was chosen and several adhesive thicknesses were applied to and tested with the prototype to confirm the simulation predictions. As shown in FIG. 27, the heating profiles for the cases with a thinner (25 μm) acrylic adhesive layer and the 25 μm thick Pyrolytic Graphite heat spreader (Samsung Corporation) had excessively long heating times, even when tested using a higher LED drive current. These results matched the finding from the simulations and showed that the thinner insulating layer was not sufficient. Additional results from the simulations are provided in FIGS. 33-36. FIG. 33 provides results from an Optical Irradiance Simulation, with Perfect Mirror transition R=1; FIG. 34 provides results from an Optical Irradiance Simulation, with 3M specular film on transition R=0.98; FIG. 35 provides results from an Optical Irradiance Simulation, with Bare Aluminum (Machined) R=0.90; and FIG. 36 provides results from a simulation of a Heat Spreader/light absorber mounted on the microfluidic chip for various light irradiances and includes (A) Fluid Average Temperature v time and (B) Max Cartridge temperature v. Time.

Figure 28:
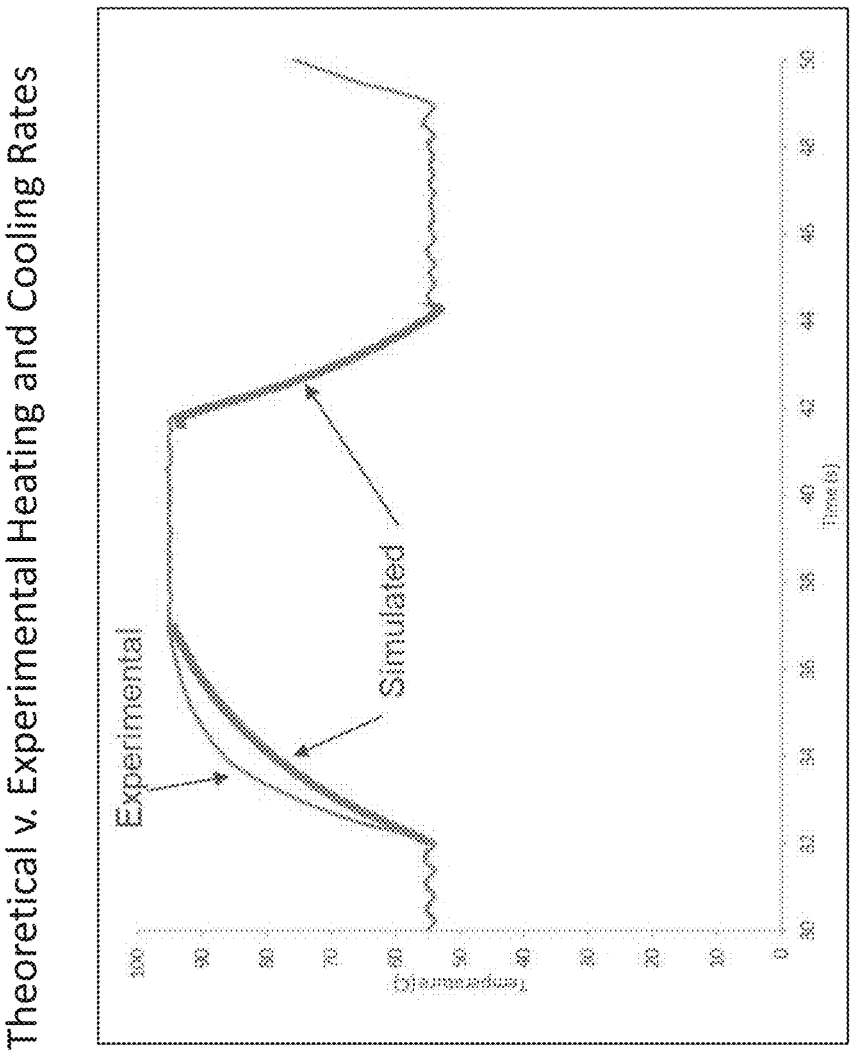
FIG. 28 is a chart showing the overlay of heating and cooling curves determined by simulation to experimental results.

FIG. 28 provides the results of the heating profile for experiments with the thermal cycler having 184 μm thick acrylic adhesive and 25 μm heat spreader (Samsung Corporation). A 12 psi vacuum was applied via a custom cartridge interface plate to hold a thin polycarbonate microfluidic cartridge onto the sapphire. The cartridge was filled with 20 μL of deionized water. A high-speed infrared thermopile-based sensor (Omega #OS-PC16-2M-1V, Omega Engineering Inc.) was used in conjunction with a custom-built software interface to monitor the temperature of the cartridge. An infrared camera (FLIR A8580 MWIR, Teledyne FLIR LLC) and its associated software (Research IR, Teledyne FLIR LLC) were used to monitor the temperature distribution on the surface of the cartridge. FIG. 28 provides the experimental results plotted with the simulated results (thick line), verifying that a close agreement was seen between the simulated and empirical values. Furthermore, the heating and cooling times were as fast as predicted, indicating good system performance.

Figure 29:
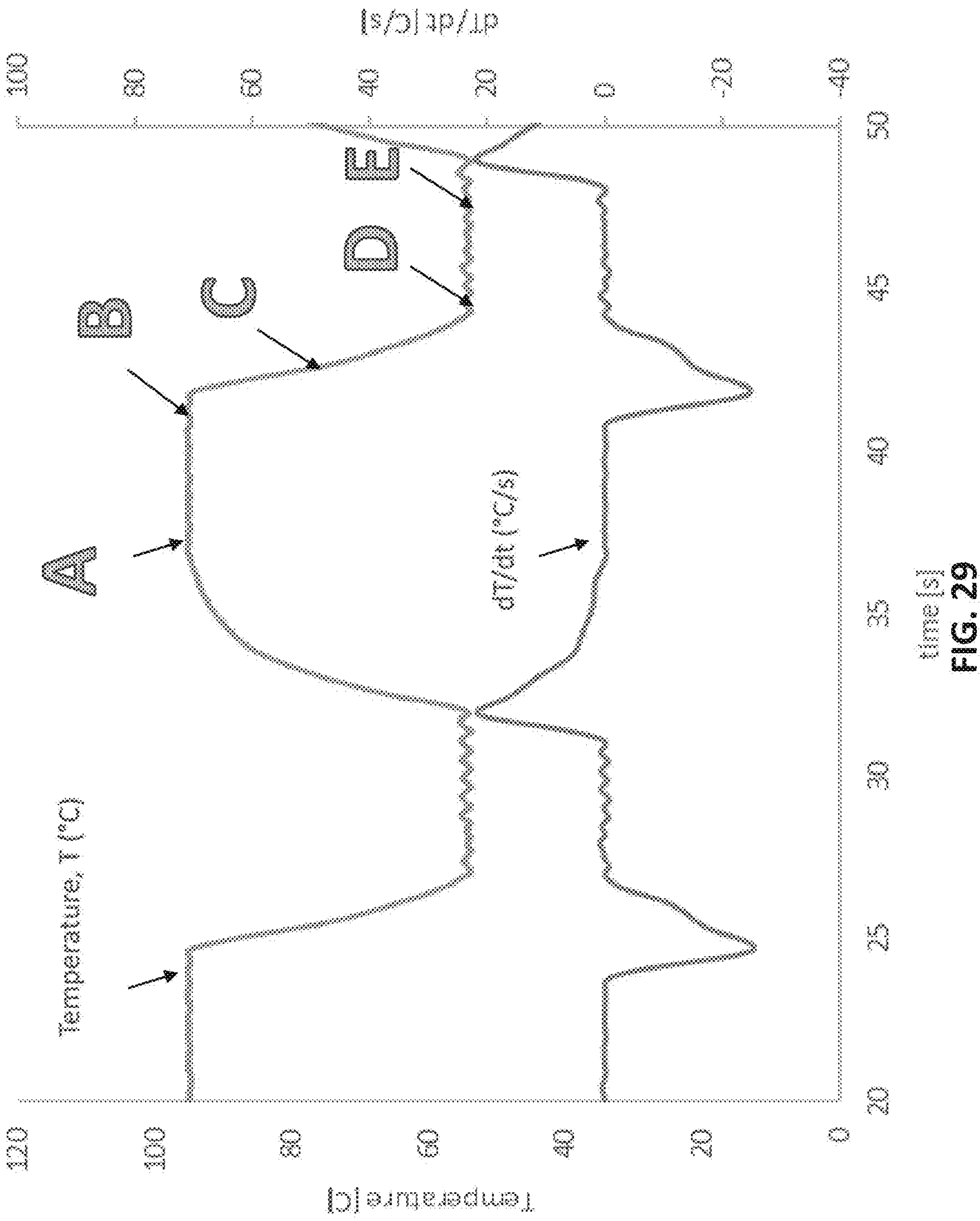
FIG. 29 is a chart depicting temperature vs. time for various heating and cooling rates.
Figure 30:
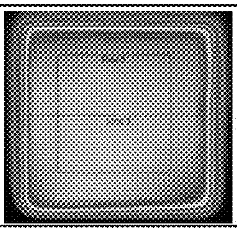
FIG. 30 is infrared thermal imaging plots of the cartridge in a thermal cycling system according to one embodiment, specific points in the thermal cycle.
Figure 30:
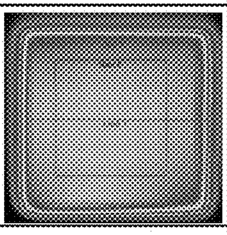
Figure 30:
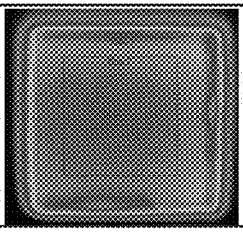
Figure 30:
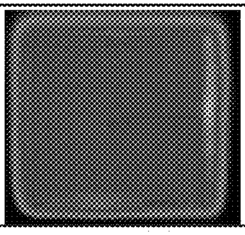
Figure 30:
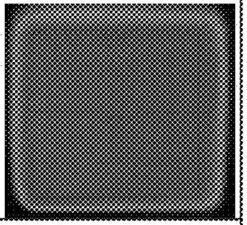
Figure 30:
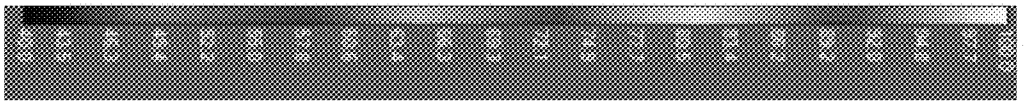

The thermal cycler prototype was loaded with a microfluidic cartridge as described above, and was subjected to a standard PCR temperature cycle. FIGS. 29 and 30 provide the results obtained from the thermal imaging system, which allowed the thermal uniformity of the cartridge to be objectively compared at various states in the thermal cycle. The letter identifiers in FIGS. 29 and 30 correlate the thermal imaging plots in FIG. 30 with the time point in the thermal cycle (in FIG. 29) at which the image was obtained. It was observed that under no circumstances did the uniformity rise above 1.4° C. (Std Deviation) in the 25×25 mm area of interest on the cartridge. This finding held at the higher denature temperature as well, indicating good thermal control and stability. Furthermore, at the lower annealing temperature where thermal control is most critical, it was observed that a 0.4° C. uniformity was possible. These results were repeated for five (5) cartridges of similar construction.

Figure 31:
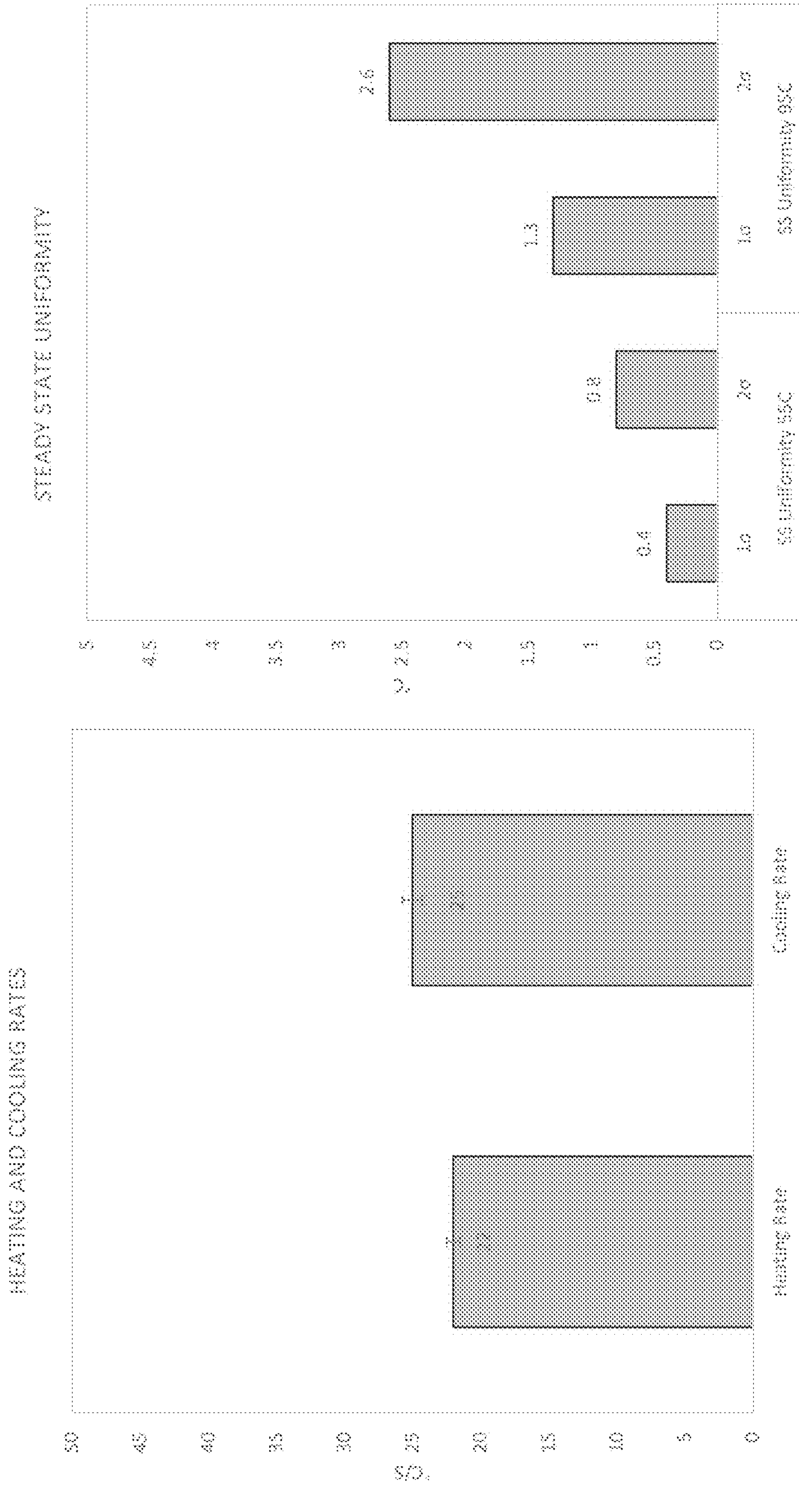
FIG. 31 is charts providing a summary of the heating and cooling rates and steady state temperature uniformity of a thermal cycling system according to one embodiment.
Figure 32:
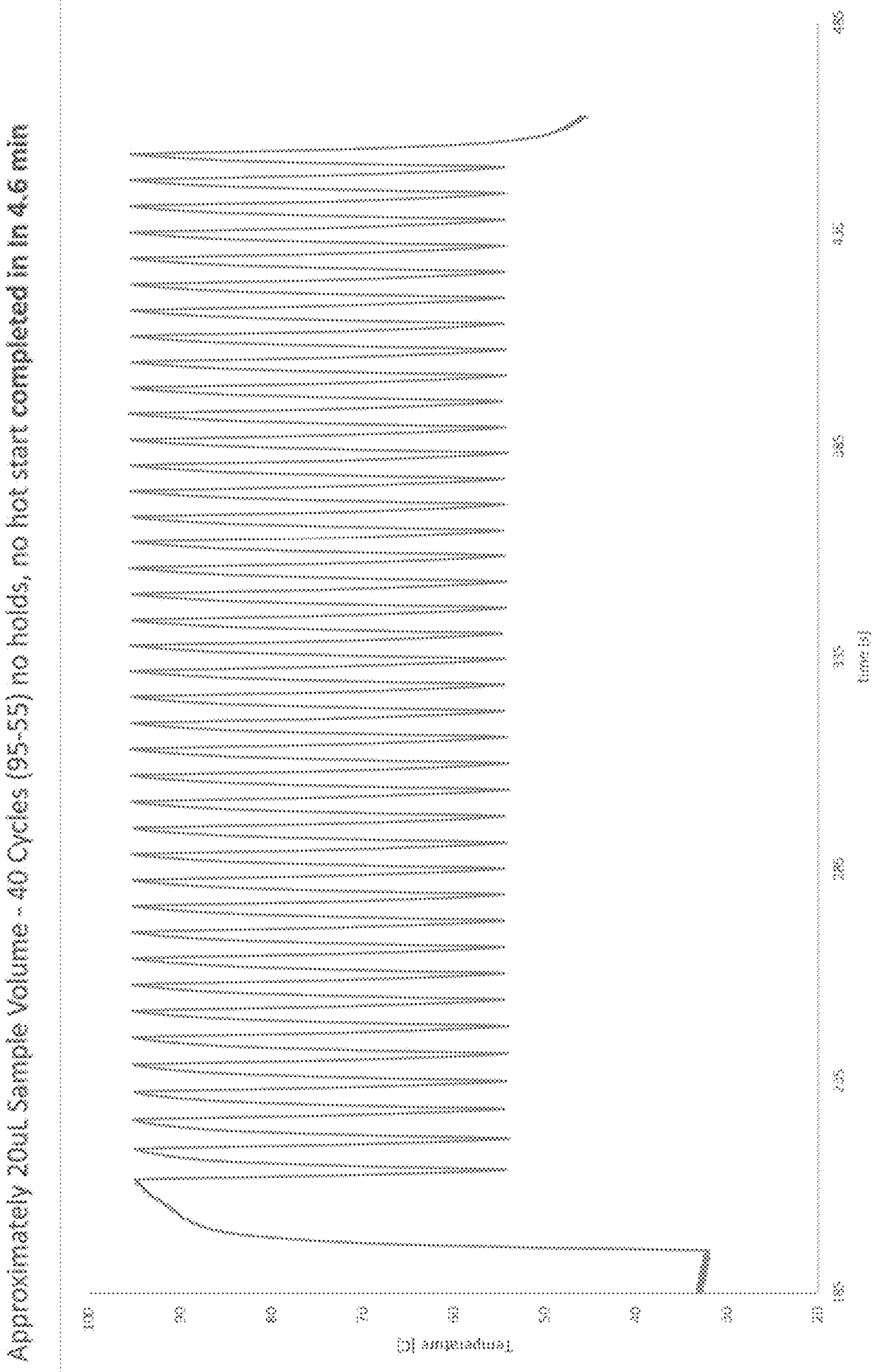
FIG. 32 is a chart depicting temperature vs. time for a complete PCR thermal cycling run using a thermal cycling system according to one embodiment.

FIG. 31 provides a graphical summary of the results for all the cartridges (n=5) tested. The results were averaged over three (3) cycles, and then averaged again for the five (5) cartridge tested. FIG. 32 is an exemplary case of one of these cartridges tested where the sample was put through a complete PCR run of 40 cycles. The complete PCR run utilized a 20 μL sample, and performed 40 cycles of 95° C. (denaturing, no hold), and 55° C. (annealing, no hold). The total run took 4.6 min, including a warm up cycle. FIG. 32 shows the quick and uniform transitions between temperatures throughout the entire cycle that were accomplished with the present thermal cycling prototype.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

As used herein, "genetic material" means any nucleic acid, including DNA and RNA. Thus, genetic material may include a gene, a part of a gene, a group of genes, a fragment of many genes, a molecule of DNA or RNA, molecules of DNA or RNA, a fragment of a DNA or RNA molecule, or fragments of many DNA or RNA molecules. Genetic material can refer to anything from a small fragment of DNA or RNA to the entire genome of an organism.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A device for thermal cycling a microfluidic cartridge comprising:

a microfluidic cartridge, wherein a light-absorbing material is in contact with the microfluidic cartridge;

a first heat sink in contact with the microfluidic cartridge;

a second heat sink that is in proximity to the first heat sink, wherein the first heat sink is within the second heat sink;

one or more light sources that are in proximity to the first heat sink; and a temperature sensor to detect a change in temperature of the microfluidic cartridge;

wherein the device is configured to alternately heat and cool the microfluidic cartridge.

2. The device of claim 1, light-absorbing material converts light to heat.

3. The device of claim 1, wherein the light-absorbing material is on or within the microfluidic cartridge.

4. The device of claim 1, wherein the light-absorbing material is contained on or within a part of the device other than the microfluidic cartridge, and the material is in thermal communication with the microfluidic cartridge when the cartridge is placed within the device.

5. The device of claim 1, wherein the first heat sink is transparent.

6. The device of claim 5, wherein the first heat sink comprises a thermally conductive material.

7. The device of claim 5, wherein the first heat sink is transparent to light within the infrared to UV wavelength range.

8. The device of claim 5, wherein the transparent first heat sink allows for the transport of light through the heat sink to the microfluidic cartridge during heating.

9. The device of claim 5, wherein the transparent first heat sink acts as a passive heat sink to cool the microfluidic cartridge during cooling.

10. The device of claim 5, wherein the light absorbing material is on the transparent heat sink.

11. The device of claim 1, wherein the second heat sink comprises a thermally conductive material.

12. The device of claim 1, wherein the one or more light sources that are one or more LEDs.

13. The device of claim 1, wherein the light from the one or more light sources is captured and transported to the microfluidic cartridge by the first heat sink.

14. The device of claim 1, additionally comprising a feedback and control unit in communication with the temperature sensor to provide temperature control of the heating and cooling.

15. The device of claim 1, additionally comprising one or more infrared sensors in proximity to the device such that the one or more infrared sensors can view the microfluidic cartridge.

16. The device of claim 1, additionally comprising at least one resistive temperature detector element in contact with a surface of the first heat sink that is in contact with the microfluidic cartridge.

17. The device of claim 1, wherein the microfluidic cartridge comprises open microfluidic channels, and a flexible heat spreader is provided between the open microfluidic channels and the first heat sink.

18. The device of claim 17, wherein when pressure is applied such that the first heat sink contacts and deforms the flexible heat spreader, the flexible heat spreader contacts the microfluidic cartridge and fluidically seals the microfluidic channels.

* * * * *